Feb. 10, 1948. S. J. BEGUN Re. 22,970

MAGNETIC SOUND RECORDING AND REPRODUCING

Original Filed June 12, 1940 7 Sheets-Sheet 1

INVENTOR
Semi Joseph Begun.
BY S. Michael Prueles
ATTORNEY

MAGNETIC SOUND RECORDING AND REPRODUCING
Original Filed June 12, 1940 7 Sheets-Sheet 2
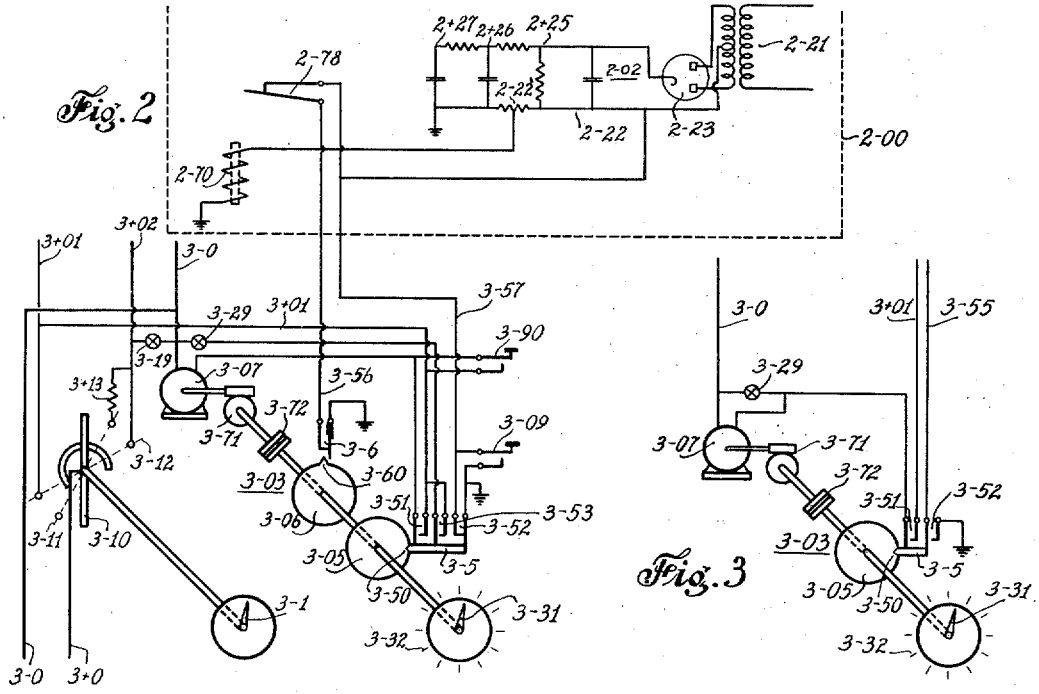
Fig. 2
Fig. 3
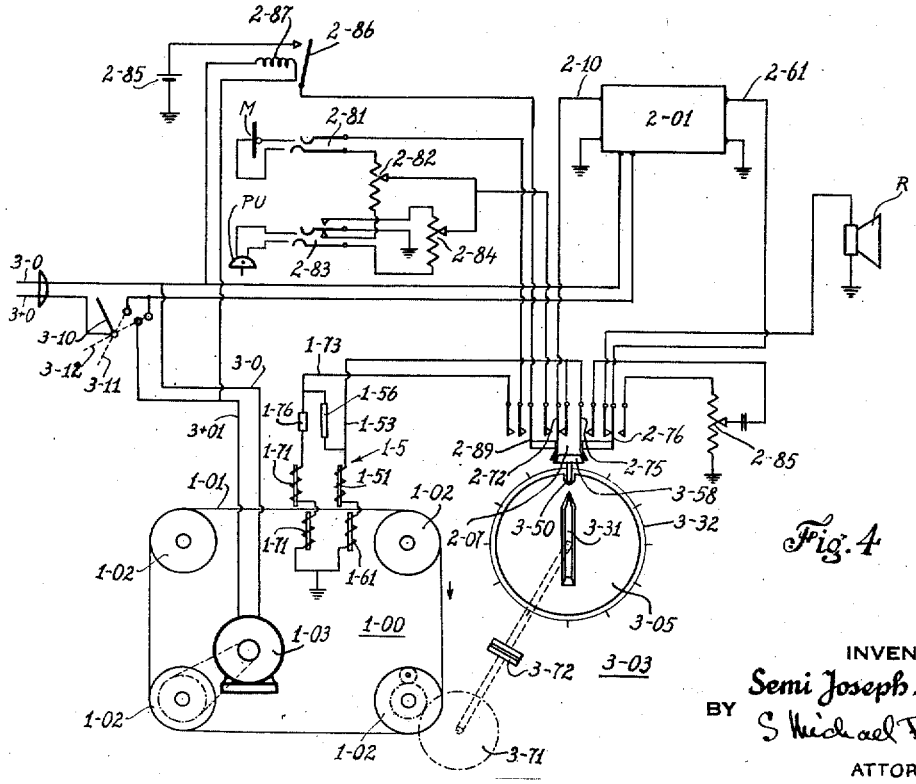
Fig. 4
INVENTOR
Semi Joseph Begun.
BY S. Michael Prueler
ATTORNEY

MAGNETIC SOUND RECORDING AND REPRODUCING

Original Filed June 12, 1940 7 Sheets-Sheet 3

INVENTOR
Semi Joseph Begun
BY S. Michael Pinales
ATTORNEY.

MAGNETIC SOUND RECORDING AND REPRODUCING

Original Filed June 12, 1940 7 Sheets-Sheet 4

INVENTOR.
Semi Joseph Begun
BY S. Michael Punales
ATTORNEY

MAGNETIC SOUND RECORDING AND REPRODUCING

Original Filed June 12, 1940 7 Sheets-Sheet 5

INVENTOR.
Semi Joseph Begun
BY Michael Pinelas
ATTORNEY

MAGNETIC SOUND RECORDING AND REPRODUCING

Original Filed June 12, 1940 7 Sheets-Sheet 6

INVENTOR.
Semi Joseph Begun
BY S. Michael Pincles
ATTORNEY

Feb. 10, 1948. S. J. BEGUN Re. 22,970

MAGNETIC SOUND RECORDING AND REPRODUCING

Original Filed June 12, 1940 7 Sheets-Sheet 7

INVENTOR
Semi Joseph Begun.
BY J. Michael Prueler
ATTORNEY

Reissued Feb. 10, 1948

Re. 22,970

UNITED STATES PATENT OFFICE 22,970

MAGNETIC SOUND RECORDING AND REPRODUCING

Semi Joseph Begun, Cleveland Heights, Ohio, assignor to Magnetone, Inc., Cleveland, Ohio, a corporation of Ohio Original No. 2,356,145, dated August 22, 1944, Serial No. 340,030, June 12, 1940. Application for reissue September 18, 1946, Serial No. 697,621

33 Claims. (Cl. 179—100.2)

This application is a continuation-in-part of the copending application Serial No. 197,851, filed March 24, 1938, now Patent No. 2,224,854, granted Dec. 17, 1940, as a continuation-in-part of the copending application Serial No. 82,962, now abandoned.

This invention relates to magnetic recording and reproducing.

Among the objects of the invention are novel arrangements and methods for controlling the recording and reproducing operations of magnetic recording apparatus, some of which are of particular value in connection with speech correction, objective speech and language study and analogous applications.

The objects of the invention also include novel pole pieces, novel pole piece bobbins, novel pole piece magnetic heads, novel magnetic record transducing methods and arrangements, novel control arrangements, novel drives, and novel reel holders and reel holder arrangements for magnetic record transducing arrangements. The term "magnetic record transducing" is used herein to designate either the process of recording electric signals into corresponding magnetic signal records impressed on a magnetic recording medium, or the process of reproducing magnetic records into electric signals, or the combination of both processes.

The foregoing and other objects of the invention will be best understood from the following description of exemplifications thereof, reference being had to the accompanying drawings, wherein Fig. 1 is a diagram illustrating the cooperative relationship of a magnetic recording arrangement of the invention;

Figs. 2 and 3 are diagrammatic views of modified forms of control arrangements for such recording arrangement;

Fig. 4 is a view similar to Fig. 1 of another form of the invention;

Figure 1:
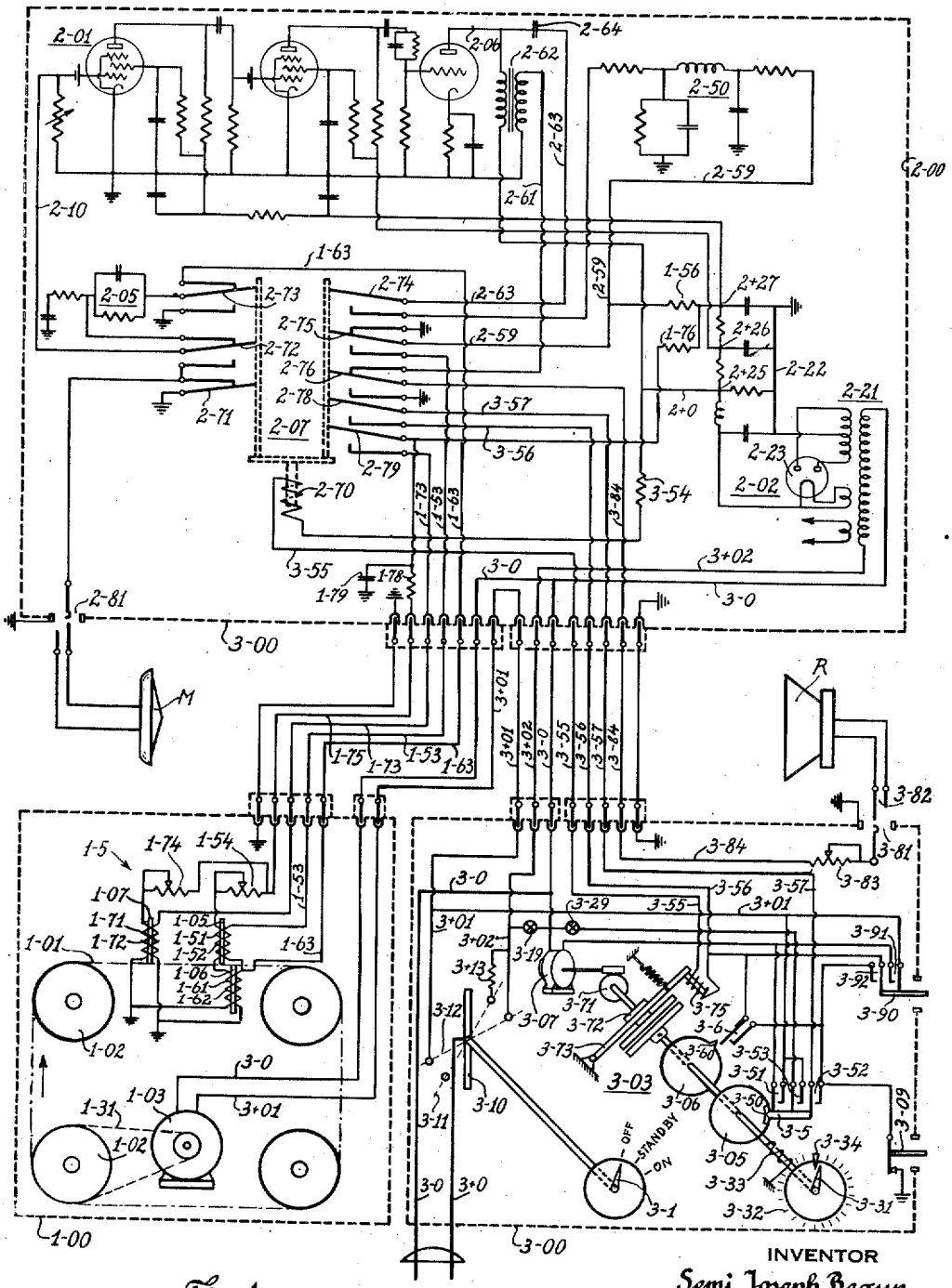
Figure 5:
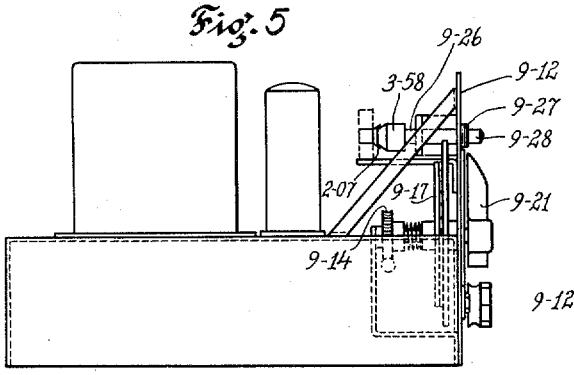
Fig. 5 is a side view of an amplifier chassis with a mechanical control mechanism of the type shown in Fig. 4.
Figure 8:
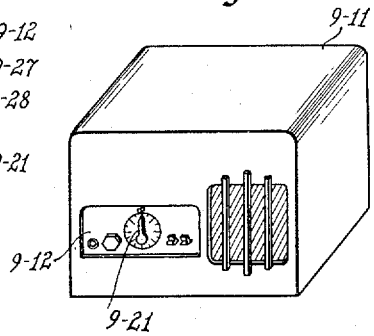
Fig. 8 is a perspective view of the housing for a recording system of the invention equipped with a control mechanism of the type shown in Figs. 5 to 7.
Figure 6:
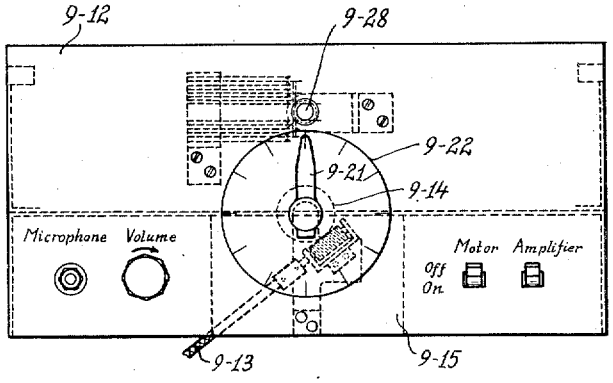
Fig. 6 is a front elevational view of the amplifier chassis of Fig. 5.
Figure 7:
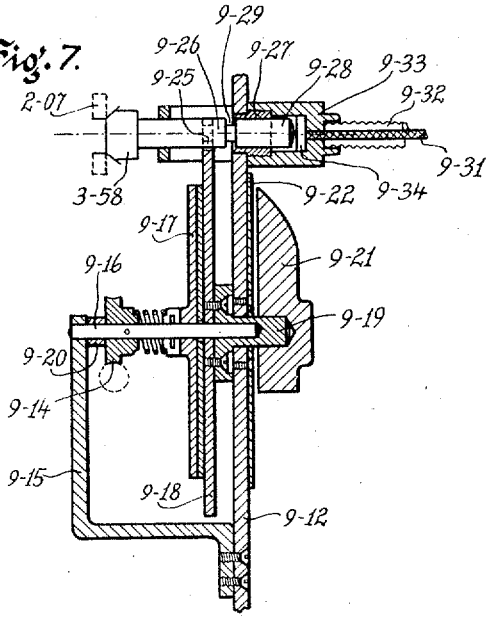
Fig. 7 is a cross-sectional detailed view of the control arrangement of Figs. 5 and 6.

No person can hear his own voice as he hears the voices of others. This is due to the fact that all external sounds are transmitted to the inner ear of the listener through the air in the ear canal while the speaker receives much of the sound emitted by himself by conduction through the bones, the flesh, and other channels within his head.

Although the fact that a person cannot hear his own voice as he hears the voices of others has been known for a long time and there has long existed an urgent need for a simple device that would enable speakers, actors, singers, students of elocution and foreign languages, persons having speech defects, such as stuttering and lisping, and all those desiring to hear their speech or voice, no simple, practical apparatus meeting these requirements have been available heretofore.

If the student could hear his own voice as he hears the voices of others, he could readily perceive his mistakes. Only by hearing a good reproduction of his voice is the student able to study his voice objectively and improve and train it by self-correction.

In the past, only mechanical recording was available for voice training by self-correction. However, to make a disc record and play it back requires manual work and dexterity. In addition, each disc can be used for recording only once. Since voice training by self-correction requires recording and listening frequently to the recorded voice, a simple foolproof recording system requiring no special handling and enabling unlimited use of a single sound carrier would be ideal.

Furthermore, experience in voice training with mechanical sound recording has shown that the very fact that the student is aware, consciously or subconsciously, that his recording remains permanent on the record and that each recording involves an expense subjects him to mental strain which prevents him from being his own self during the recording. In most cases he must be assisted by another person in handling the recording apparatus, and the presence of any person prevents the student from recording in a relaxed mental state as he would ordinarily do if left by himself.

The present invention provides magnetic record transducing apparatus which makes possible recording and reproducing of sound records or the like while eliminating these difficulties and making available an ideal medium for effective voice study and training as well as speech correction.

A single recording medium is used over and over again for new voice records. A small magnetic recording head records and reproduces the speech without any observable change in the recording medium; the process of making a new record obliterates the preceding record. The speaker can hear his voice as soon as it is recorded, and can repeat the reproduction as many times as he desires. By a simple operation, the student may compare his own recording with a model record until by succession of his own recordings, he learns all his deficiencies and reaches an approach to the model record. The student is able to do it all by himself, without the presence of others, in a perfectly relaxed state, and is thus enabled to make great progress in a short period of time.

All the operating and control elements of the recording and reproducing system are arranged and correlated to permit easy and economical construction and assembly of the apparatus of the invention and to assure its foolproof operation when in use.

Fig. 1 illustrates diagrammatically the cooperative relationship and the electric circuit connections of the various elements of one form of a magnetic recording apparatus arrangement exemplifying the invention.

It comprises a recording mechanism shown as a separate unit 1—00, an amplifier arrangement shown as a unit 2—00, and a control unit, shown as a unit 3—00, each of the units being enclosed in a separate casing, for instance, the various elements of the several operating units being interconnected by leads of interconnecting cords.

The recording mechanism 1—00 comprises a frame structure, not shown, in which a magnetic record carrier, such as a recording track formed of tape 1—01, of magnetizable material, is wound in the form of an endless helix, on a plurality of suitably-mounted spaced cylindrical guide rollers 1—02, the loops of the helix having frictional driving engagement with the roller surfaces. A motor 1—03, of the squirrel-cage, induction-type, for instance, drives, through a belt 1—31, for instance, one of the rollers 1—02, so as to impart to the magnetic tape 1—01 uniform speed, in clockwise direction, for instance, as indicated by an arrow. A set of record transducing pole pieces 1—05, 1—06, of magnetic material, having thereon transducer coils 1—51, 1—61, and an obliterating pole piece 1—07, having thereon an obliterating coil 1—71, arranged as a part of a magnetic transducer head, are placed adjacent to a portion of the moving tape 1—01, for making magnetic record transductions therewith, such as magnetic recordings, or reproducing the recordings therefrom.

The principles underlying the operation of such magnetic recording apparatus are explained in my paper published in the Journal of the Society of Motion Picture Engineers, vol. 28, 1937, pp. 464–472.

The amplifier arrangement 2—00 comprises an amplifier 2—01, a power supply system 2—02 and a recording relay 2—07. The power supply system 2—02 comprises a transformer 2—21 having a primary winding and secondary windings to which are connected a rectifier 2—23 and a filter network, formed of a choke coil, condensers and resistors connected through a lead 2—22 to ground and arranged to deliver at its terminals 2+25, 2+26, 2+27, filtered positive D. C. voltage required for operating the amplifier and other elements of the apparatus.

The amplifier 2—01, has, as shown conventionally, a grounded side, and an input lead 2—10, through which the input, that is to be a amplified, is impressed upon the amplifier. The amplified output is delivered by the amplifier through an output lead 2—06 either to a low impedance output lead 2—61 or by way of a transformer 2—62, or by way of coupling condenser 2—64 to a high impedance output lead 2—63.

The amplifier 2—01 may be of the conventional type and is designed to have a gain which is sufficient to deliver with an input voltage induced by a magnetic recording in the transducing coil windings 1—61, an output sufficient to operate a conventional loudspeaker. An equalizing network 2—05 is connected in the input circuit of the amplifier during the repreducing process and an equalizing network 2—50 is connected in the high impedance output circuit of the amplifier during the recording process, so as to give an overall amplification which secures high quality recording and reproduction of speech and music.

The recording relay 2—07 is of the conventional telephone relay type. In the form shown it has an actuating coil 2—70 and two sets of contact spring blades 2—71 to 2—73 and 2—74 to 2—79 which are normally biased to establish, in conjunction with their associated contact springs, the circuits required for reproducing a recording previously made on the magnetic carrier 1—01. Upon energization of the recording relay coil 2—70, its contact spring blades are flexed to their opposite contact positions in which they establish the circuits to make a new recording on the magnetic carrier 1—01.

There is also shown mounted on the amplifier casing 2—00 a jack 2—81, having a grounded contact for connecting a cord plug from a phonograph pickup or a microphone M to the input side of the amplifier.

The apparatus is shown designed for energization from a domestic alternating current (A. C.) power supply circuit through two supply leads 3+0, 3—0 of opposite polarity. An energizing switch having a contact blade 3—10 which may be actuated, for instance, by a pointer knob 3—1, serves to energize or deenergize the operating circuits of the apparatus. The energizing switch blade 3—10 is movable from the open position, shown in the drawings, to the position 3—11, in which it ocnnects the power supply lead 3+0 by way of a current limiting resistance 3+13 and a lead 3+02 to one end of the primary winding of transformer 2—21, the other end of which is connected to a cord extension of the other power supply lead 3—0 of opposite polarity.

The current limiting resistor 3+13 through which the amplifier transformer 2—21 is energized in the standby position 3—11, is so proportioned as to apply a reduced voltage to the amplifier tube cathodes sufficient to heat them to a sub-normal temperature and to enable rendering the amplifier fully operative the instant the energizing switch blade 3—10 is moved from position 3—11 to position 3—12, in which the transformer 2—21 is fully energized from the power supply lead 3+0.

When the energizing switch blade 3—10 is moved to the position 3—12, it also completes an energizing circuit from the power supply lead 3+0, by way of lead 3+01 and its cord extensions to the tape driving motor 1—03, the other terminal of which is connected to an extension of the power supply lead 3—0 of opposite polarity, thereby actuating the tape driving motor to drive the tape at its normal uniform speed. A signal lamp 3—19 indicates the energized condition of the apparatus.

The control mechanism 3—03 is designed to enable selective control of the operating circuits required to make a new recording. In the form illustrated in the drawings, the control mechanism 3—03 comprises switch cam members 3—05, 3—06 arranged to be driven in a substantially synchronized relation to the travel of the magnetic carrier 1—01, in clockwise direction, for instance, by a small motor 3—07, through a reducing gear 3—71 and a friction coupling clutch 3—72. The clutch is arranged to be selectively actuated, for instance, by providing it with a coupling disc which is normally biased by a lever 3—73 to an uncoupled condition to break the driving connection between the switch cams 3—05, 3—06 and the synchronizing motor 3—07. A solenoid having a solenoid coil 3—75 serves to actuate the clutch coupling discs to the coupling position upon the energization of the solenoid coil.

A pointer knob 3—31, extending from the switch cams 3—05, 3—06, and movable along a dial 3—32, enables manual rotation of the switch cams. When the coupling connection 3—03 is open, a return spring 3—33 automatically returns the switch cams 3—05, 3—06, and the pointer knob to the normal position shown in the drawings, a stop 3—34 serving to retain the pointer knob in the normal position.

Cam 3—05 operates a switch 3—5 which is shown normally biased by its contact springs into a cam depression 3—50 so that its contact blades are flexed to their outward position when the cam 3—05 is turned from its normal position. Cam 3—06 serves to actuate a switch 3—6, which is normally biased by its contact spring to the open position shown in the drawings, and is arranged to be momentarily closed when the projection 3—60 of cam 3—06 is given a slight clockwise turn, for instance. The spring arm of the cam switch 3—6 is sufficiently damped so that after it is momentarily flexed to the closed position by turning the cam projection 3—60, it will aperiodically return to its normally open position and prevent the closure of its contacts when the cam 3—06 is returned to its normal position by spring 3—33.

In practice, the control mechanism 3—03 is so designed that substantially one full rotation of the synchronizing switch cam 3—05 corresponds to the full length of the tape track on which a recording is to be made, such as the full length of the endless tape, and the control mechanism is so designed and arranged as to permit selective starting of a new recording on any selected portion of the moving tape and to permit selective confining of a new recording to a selected portion of the tape.

The dial 3—32 may be calibrated to indicate the progress of a recording operation in terms of the length of the recording period or the length of the tape track on which a recording is made.

The control mechanism 3—03 serves not only to control the length of the recording operation but also to indicate the progress of the travel of the tape past the magnetic head and the progress of a new recording made on the magnetic carrier. Small standard, synchronous or slightly off-synchronous motors, suitable for housing together with all the other elements of the control mechanism in a small portable casing, may be used to synchronize its operation to the motion of the tape that is driven by a standard squirrel-cage induction-type motor.

The control mechanism 3—03 is so designed and arranged that upon giving a slight turn to its switch cams 3—05, 3—06, for instance, by imparting a small turning motion to the pointer knob 3—31, the cam discs actuate the spring contact switches to positions in which they establish circuits which effect a change in the operating conditions of the apparatus, in the present case, from a normal reproducing condition to a recording condition; and to maintain the recording condition for a predetermined length of the travel of the tape track.

The control arrangement may be combined with a separate recording starting switch 3—90 and a separate recording stopping switch 3—09, which may be designed either for remote control operation, or for actuation by a push button mounted on the exterior of the control unit, so as to enable starting and stopping of a new recording without direct manipulation of the control mechanism 3—03.

The control unit may have also mounted on its wall, a jack 3—81, one side of which is grounded, for receiving the cord plug 3—82 leading to a reproducer such as a loudspeaker R. A volume control potentiometer 3—83 mounted on the control unit enables adjustment of the volume of the sound delivered by the reproducer R.

When the energizing switch 3—10 is in its "on" position 3—12, in which the amplifier and the tape driving motor 1—03 are fully energized, a record previously made on the magnetic carrier 1—01 will be reproduced, and the reproduction will be continuously repeated, the recording relay 2—07 remaining biased in the normal position shown in the drawings in which its contact springs establish the following record reproducing circuits:

An amplifier input circuit from the transducer coil 1—61, in which the moving magnetic wave of the tape 1—01 induces a signal voltage, through coil lead 1—63, by way of the cord, the closed recording relay contacts 2—73, the equalizing network 2—05, and the recording relay contacts 2—72 to the input lead 2—10 of the amplifier so as to impress thereon the signal voltage which is to be amplified, the circuits being completed through the grounded sides of the transducer coil 1—61 and the amplifier.

An amplifier output circuit from the secondary winding of the output transformer through the low impedance output lead 2—61, the closed contacts 2—76 of the recording switch, by way of the cord lead extension of the reproducer lead 3—84 to volume control potentiometer 3—83 and jack 3—81 to the reproducer R, the various circuits being completed through the conventionally indicated grounded sides of the output transformer winding and the jack.

In order to make a recording, the recording relay 2—07 is energized to establish in the flexed position of its contact blades the following circuits:

A recording amplifier input circuit from the microphone M, for instance, through jack 2—81, the closed flexed recording relay contact 2—72, to the amplifier input lead 2—10, for impressing the microphone output on the input side of the amplifier M. The microphone M shown in the drawings is of a high impedance type, such as a crystal microphone, and requires no step-up transformer for coupling it to the input side of the amplifier.

A recording amplifier output circuit from the high-impedance amplifier output lead 2—63, through the closed flexed recording relay contact 2—74, the recording equalizing network 2—50, junction lead 2—59, the closed flexed recording relay contacts 2—75, the cord lead extension 1—53 through the serially connected transducer coils 1—51, 1—61 of the pole pieces 1—5, 1—6 to ground, the circuit being completed by the grounded side of the amplifier. The same circuit supplies to the transducer coils 1—51, 1—61, a superimposed D. C. depolarizing current through the connection to its lead 2—59 by way of a current adjusting resistor 1—56, to the positive terminal 2+27 of the filter rectifier circuit 2—02.

At the same time, there is also supplied a direct current to the obliterating coil 1—71 of the obliterating pole piece 1—07 from the positive filter terminal 2+27, through the current adjusting resistor 1—76, closed flexed recording relay contacts 2—79, cord-lead extension 1—73 and the obliterating coil 1—71 to ground, the circuit being completed through the grounded side of the filter circuit.

Instead of using only the transducer coil 1—61 for the reproducing process both serially connected transducing coils 1—51, 1—61 may be used for recording as well as reproducing, in which case the lead 1—63 is disconnected from transducer coil 1—61 and connected to the blade of the recording relay contacts 2—75 to which transducer coil lead 1—53 is connected.

As explained hereinabove, the various elements of the apparatus shown in Fig. 1 are so arranged that when the energizing switch 3—10 of the control unit 3—03 is in the "on" position 3—12, the signal recorded on the tape is continuously reproduced. The control mechanism 3—03 of the control unit serves to selectively start a new recording at any selected time on any selected portion of the traveling magnetic tape 1—01, and, also, to indicate the progress of a recording operation.

Under normal operating conditions, the synchronizing switch cam elements 3—05, 3—06 and the associated cam switches remain stationary in their positions shown in Fig. 1.

A new recording may be started by giving a slight turn to the pointer knob 3—31 of the control mechanism 3—03 thereby momentarily closing its cam switch 3—6 and closing cam switch 3—5 in which position they establish the following operating circuits:

An energizing circuit for the recording relay coil 2—70 and the clutch coil 3—75, from the positive power supply terminal 2+25, through a lead including current adjusting resistor 3—54, recording relay coil 2—70, cord extension of lead 3—55, clutch actuating coil 3—75, the momentarily closed cam switch contacts 3—06, the closed cutoff switch contacts 3—09 to ground, the circuit being completed by the grounded side of the filter.

At the same time, the synchronizing motor 3—07, one terminal of which is connected to the power supply lead 3—6 has its other terminal connected through the closed cam switch contacts 3—51 to the power supply lead extension 3+01 of opposite polarity.

The so-energized synchronizing motor 3—07 will rotate the cam 3—05 and keep its cam switch 3—5 in the flexed position in which its closed contacts 3—51 maintains the synchronizing motor 3—07 energized, while its contacts 3—53 energizes signal lamp 3—29 to indicate that the apparatus is in the recording condition. The simultaneously rotated switch cam 3—06, after momentarily closing cam switch 3—6, releases it to its open position, but the previously established energizing circuit for the recording switch coil 2—70 and the clutch coil 3—75, is not broken because a parallel locking circuit has been completed by the closed recording relay contacts 2—78, the closed cam switch contacts 3—52, the leads 3—56, 3—57 and ground.

The cam switch 3—5 remains in its outwardly flexed position until the cam 3—05 has made almost one full rotation corresponding to the length of a new recording made over the full length of the magnetic carrier 1—01 on which a new recording is to be made. The synchronizing switch cam 3—05 is so shaped, proportioned and arranged that the moment a new recording has been made on the entire length of the tape on which a new recording is to be made, it releases its cam switch 3—5 to its normally biased unflexed position in which it breaks at its contacts 3—52, the energizing circuit for the recording switch coil 2—70 and the clutch coil 3—75, and at its switch blades 3—51, 3—53 the energizing circuits for the synchronizing motor 3—07, and signal lamp 3—29, respectively.

Thereupon, the recording switch is instantaneously returned to its normal reproducing position shown in the drawings, breaking at its contacts 2—78 the locking circuit which maintains it energized during the recording operation. The return spring 3—33 returns the cam discs 3—05, 3—06, to their normal position determined by stop 3—34, and since switch contacts 3—6 remain open, the recording switch coil 2—70 remains deenergized. All operating circuits of the apparatus are thus restored to their normal reproducing positions.

By manual actuation of the synchronizing cam 3—05, namely turning it by its pointer knob 3—31, against the friction of the clutch 3—72, the recording may be stopped at any time before the end of one rotation of the cam 3—05, or the recording may be limited to a desired length of the tape, as indicated on dial 3—32 when the recording is started by initially turning the pointer knob 3—31 to the desired point on the suitably calibrated dial scale.

An arrangement such as the cutoff switch 3—09, actuated by a simple push button, for instance, enables instantaneous stopping of a recording without directly manipulating any element of the control mechanism 3—03. On actuating the recording cutoff switch 3—09, the energized locking circuit for recording relay coil 2—70 and the clutch coil 3—75 are instantaneously deenergized, causing the switch cam 3—05 to be returned by its biasing spring 3—33 to its normal position, thereby completing reestablishing the reproducing circuit connections.

An arrangement, such as the starting switch 3—90 actuated by a push button, for instance, enables instantaneous starting of a new recording without manually actuating the control mechanism 3—03. On actuating the starting switch 3—90, its contact blades 3—92, which are connected parallel to the cam switch contacts 3—6 and 3—51, complete the same starting circuits as are completed by giving a slight turn to knob 3—31 of the control mechanism 3—03.

With such arrangement, momentary actuation of the starting switch 3—90 will start a recording at any time, on any selected portion of the tape, and the recording will continue until a new recording on the full length of the tape is made, unless by a momentary actuation of the recording cutoff switch 3—09 the recording is stopped on any desired point of the moving tape, before one complete revolution of the synchronizing cam 3—05.

In the operation of magnetic recording devices it is important to suppress any remanent magnetism left in the recording and obliterating pole pieces after the completion of each recording. In accordance with the invention such complete suppression of remanent magnetism may be effected by subjecting the pole piece to a continuous small D. C. demagnetizing current acting in a direction opposite to the D. C. magnetizing current to which the pole pieces are subjected during the recording operation. The demagnetizing current is left flowing during reproducing as well as recording, and is adjusted to neutralize, or suppress any remanent magnetization left in the pole pieces after the transducer coils 1—51, 1—61, 1—71 are disconnected from their circuits and while they are not subjected to any other magnetizing force. This adjustment may be made while subjecting the pole piece to a magnetic checking test, or by reproducing with a completely demagnetized tape.

Such arrangement is illustrated in Fig. 1. The pole pieces 1—05, 1—06, 1—07 of the magnetic recording head are shown provided with additional coil windings 1—52, 1—62, 1—72, respectively, which are connected to be supplied with a highly filtered D. C. current derived, for instance, from the positive filter rectifier terminal 2+27 through a lead 1—75, a series resistor 1—78 and shunt condenser 1—79 being interconnected with lead 1—75 to provide additional filtration for the small demagnetizing D. C. current supplied therethrough. The additional coil turns of the transducer pole pieces and obliterating pole piece are so wound and the D. C. current flowing through them is so adjusted, as by the adjusting and decoupling rheostats 1—54, 1—74, respectively, that any remanent magnetization in the pole pieces is neutralized to assure that traces of remanent magnetization in the pole piece material do not affect the reproducing operation and do not raise the noise level.

Fig. 2 illustrates a modified form of control mechanism for a recording apparatus of the type shown in Fig. 1, in which the rectifier-filter system 2—02 is modified to supply in addition to the relatively high D. C. amplifier operating voltage, a low operating voltage for the relay circuits, thereby eliminating the difficulties encountered when using high D. C. voltages for operating relay circuits. The rectifier-filter network 2—02 is shown modified by connecting a series resistor 2—22′ in the filter ground lead 2—22 between the rectifier 2—23 and the filter ground. The series resistor 2—22′ is proportioned to give a low D. C. voltage drop against ground, for instance, of the order of about 50 volts, such as used in ordinary telephone relay circuits. The recording relay coil 2—70 is directly connected between ground and a tap of the series resistor 2—22′. The control mechanism 3—03, which is shown in simplified form, is rearranged so that during the normal reproducing condition, the filter ground lead resistor 2—22′ and recording relay coil 2—70 are short-circuited, and thus deenergized.

In the control arrangement shown in Fig. 2, which is, similar to that of Fig. 1, this is accomplished by arranging the auxiliary cam switch contacts 3—6 and the recording relay contacts 2—78 to remain normally closed and apply through lead 3—56 a short-circuiting de-energizing ground potential to the filter lead resistor 2—22′, which is removed only upon momentary actuation of cam switch 3—6 when starting a recording. In addition, the synchronizing switch contacts 3—52 are rearranged to be normally closed and complete through lead 3—57, a de-energizing locking short-circuit around ground lead resistor 2—22′, which is opened when the recording starting turn is given to the synchronizing cam 3—05.

As in Fig. 1, a recording may be started by giving a slight turn to the pointer knob 3—31 of the control mechanism 3—03, thereby opening the two parallel de-energizing short-circuits at the cam switch contacts 3—6 and at the synchronizing cam switch contacts 3—52 whereupon the recording relay is energized and actuated to the recording position in which its open flexed contacts 2—78 open the de-energizing circuit leading through the momentarily opened cam switch contacts 3—6. As a result, the short circuit across resistor 2—22′ remains removed, and the full operating voltage remains applied to the recording relay coil 2—70, while the synchronizing cam makes one complete revolution, unless it is previously returned to the normal reproducing position, by manually actuating knob 3—31.

As in the arrangement of Fig. 1, the control arrangement of Fig. 2 may be provided with a starting switch 3—90 and a cutoff switch 3—09. The starting switch 3—90 has only one pair of normally open contacts connected parallel to the synchronizing switch contacts 3—51, so that upon their actuation to the closed position, the synchronizing motor 3—07, is immediately energized. The initial rotation imparted by the synchronizing motor 3—07 to the control cams 3—05, 3—06, has the same effect in starting a new recording as the manual actuation of the control cams 3—05, 3—06 described above.

The cutoff switch 3—09 has likewise only one pair of normally open contacts, connected parallel to the synchronizing switch contacts 3—52, so that upon its actuation to the closed position, during the recording operation, it momentarily completes a short-circuit across the voltage supply to the recording relay coil 2—70, and momentarily deenergizes it. As a result, the deenergized recording switch 2—70, in returning to the normal reproducing position, instantaneously closes its locking contacts 2—78, reestablishing a deenergizing ground connection to the rectifier end of the ground lead resistor 2—22′, and short-circuiting the energizing source of the recording relay coil 2—70. The synchronizing cam switch, 3—5 still remains in its outward position while its cam is being rotated by the energized synchronizing motor 3—07, until after one complete revolution, the cam depression 3—50 returns the cam switch 3—5 to its normal position in which the synchronizing motor 3—07 and the recording signal lamp 3—29 are deenergized, thereby restoring all the operating circuits to their normal reproducing condition.

In this arrangement, only a simple friction clutch coupling 3—72 is provided between the synchronizing motor and the synchronizing cam 3—05, and the return spring 3—33 is eliminated. The control arrangement of Fig. 2 has thus all the advantages of the control arrangement of Fig. 1, except for the fact that if the recording is cut off by its cutoff switch 3—09, a new recording cannot be started until the cam 3—05 has completed a full revolution and has returned the synchronizing cam switch 3—5 to its normal position.

In Fig. 3 is shown a simplified recording control arrangement for an apparatus of the type shown in Fig. 1. In this arrangement the synchronizing cam disc 3—05 with its cam switch 3—5 serve as the sole control element for selectively starting and stopping a new recording. The synchronizing cam switch 3—5 has only two sets of contacts 3—51 and 3—52, which, as in Fig. 2 control the energization of the synchronizing motor 3—07 and of the recording relay coil 2—70, respectively.

To start a new recording, a slight turn is given to the synchronizing switch cam disc 3—05 to complete at its closed flexed contacts 3—51 the energizing circuit for the synchronizing motor 3—07 and recording signal lamp 3—29 and at its closed flexed contacts 3—52 completes through lead 3—55 the energizing circuit for recording relay coil 2—70 the other end of which is as in Fig. 1, connected to a positive filter terminal 2+25, for instance.

As in the arrangement of Fig. 1, the synchronizing switch cam 3—05 and its drive are so arranged and proportioned that one complete rotation of the switch cam 3—05 corresponds substantially to a full length of the moving tape 1—01 on which a new recording is to be made. As soon as the cam 3—05 has completed one rotation, its cam switch 3—5 is released into the cam depression 3—50, thereby breaking the recording switch coil circuit and the synchronizing motor energizing circuits, and instantaneously reestablishing the reproducing circuits.

To stop the recording before the cam competes one revolution, the user has merely to manually turn the pointer knob 3—31 to its starting position, or to initially turn the pointer knob 3—31 to a point on the dial corresponding to the length of the tape on which he desires to make a recording.

By the new apparatus of the invention, a person desiring to learn a language is free from the burden of handling the recording medium, such as a disc or film. A student of speech, or of a foreign language, can hear his own speech as soon as it is recorded and, without waiting, he may repeat the recording and reproducing operations as many times as desired. By plugging in a phonograph or radio receiver lead to jack 2—81, he may record a model sound sequence from another record or a broadcast that he desires to imitate on a portion of the carrier and compare such model recording with his own recordings made on a different part of the carrier, which he is able to obliterate at any time by a new recording of his own voice without obliterating the model recording.

The apparatus of the invention serves thus not only as a simple foolproof mirror of the voice, but it also enables a student of speech and languages to compare his own speech with a sample speech recorded from a phonograph or a radio on one portion of the tape, while he uses another portion of the tape for making his own record.

By combining the endless magnetic carrier with a control mechanism having a movable control member arranged to be selectively driven in predetermined synchronized relation to the moving carrier for controlling the duration of the recording operation, a simple single grip control makes possible starting a new record on any selected portion of the endless carrier; and a simple single grip control makes it possible to confine the new recording to a selected portion of the endless carrier without obliterating a selected portion of a previous recording.

Fig. 4 illustrates a magnetic recording apparatus of the type described in connection with Fig. 1 having its elements arranged in a somewhat different way. It comprises a recording mechanism 1—00, similar to that of Fig. 1, an amplifier 2—01 having an input lead 2—10 and an output lead 2—61 and a manually operated recording control switch 2—07 which, as in Fig. 1, has sets of spring contacts, which, in the shown normally biased position, establish the reproducing circuits and are arranged to be flexed for breaking the reproducing circuits and establishing the recording circuits.

The amplifier and the tape driving motor are arranged to be energized from supply leads 3—0, 3+0, and as in Fig. 1, an energizing switch 3—10 completes in position 3—11 an energizing circuit for the amplifier only, and in position 3—12, an energizing circuit for the amplifier as well as for the tape driving motor 1—03. There is also provided a control mechanism 3—03 for selectively controlling the recording operation as well as for indicating the progressive travel of the magnetic carrier 1—01 during the recording operations.

The control mechanism comprises a synchronizing cam 3—05 arranged to be selectively coupled, as by a friction coupling clutch 3—72, to a shaft which is connected through a speed reduction gearing 3—71 to one of the tape guiding rollers 1—02, which are driven in synchronism with the tape 1—01. The speed reduction mechanism 3—71 is so designed as to impart to the synchronizing cam 3—05 one revolution during the time required for making a new recording on the substantially complete length of the endless carrier 1—01.

The synchronizing cam 3—05 is shown in the form of a rotatably mounted disc having on one point of its periphery a depression 3—50 which in the position shown in Fig. 4 is engaged by a locking projection of a switch key 3—58 of the recording switch 2—07, the biasing action of the spring contacts of the recording switch 2—07 holding the switch key 3—58 in the locked position. The synchronizing cam 3—05 is also shown provided with a pointer knob 3—31 for indicating on a dial 3—32 the progressive travel of the carrier 1—01 when the synchronizing cam 3—05 is unlocked and is driven by the friction coupling 3—72 in predetermined synchronized relation to the travel of the magnetic carrier tape 1—01.

The cam disc 3—05 with its synchronizing drive, the recording switch 2—07 and their associated elements are so designed and proportioned that when the key 3—58 is actuated to release its locking engagement with the cam depression 3—50, the synchronizing cam 3—05 is driven by its coupling clutch 3—72 during one full revolution while the outer cam surface of the synchronizing cam 3—05 holds the key in the lifted position in which it actuates the contacts springs of the recording switch 2—07 to their flexed position in which they establish the recording circuits; and to cause the biasing action of the spring contacts of the recording switch 2—07 to their normal reproducing positions to return and to actuate the switch key 3—58 into its locking engagement with the cam depression 3—50 of the synchronizing cam 3—05 at the end of one revolution of the synchronizing cam, and thereby reestablish reproducing conditions.

In the normal operating position shown in Fig. 4, in which the synchronizing cam 3—5 is held locked in stationary position by the switch key 3—58, the contacts of the recording switch 2—07 remain in their normally biased unflexed position in which they establish the following record reproducing circuits:

From the ungrounded side of the serially connected transducer coils 1—51, 1—61 in which the moving magnetic wave of the tape induces a signal voltage, through lead 1—53, by way of the normally closed recording switch contacts 2—72 to the amplifier input lead 2—10 for impressing on the amplifier the signal voltage which is to be amplified, the circuits being completed through the grounded side of the transducer coil 1—61 and the grounded side of the amplifier.

The amplified output is delivered by the amplifier through a circuit including amplifier output lead 2—61, the normally closed recording switch contact 2—76 to the reproducer R, the circuits being completed by the grounded side of the amplifier 2—01 and the grounded side of the reproducer R.

When the key 3—58 of the recording switch is actuated to unlock the synchronizing cam 3—05 and to flex the contacts of the recording switch 2—07, its flexed blades, which remain in the flexed recording position while the synchronizing cam 3—05 rotates, establish the following recording circuits:

A recording amplifier input circuit from the amplifier input lead 2—10, through the flexed closed recording switch contacts 2—72, to a tap of the volume control potentiometer 2—82, one side of which is connected through a contact at the phonograph jack 2—83, to ground. The other end of the volume control potentiometer 2—82 is connected by way of a jack 2—81 to a microphone M, indicated as a carbon microphone, to which its small exciting current may be supplied from a dry cell 2—85. As shown in Fig. 4, the dry cell 2—85 is normally disconnected from the operating circuits by the normally open relay contacts 2—86, which are closed only when the associated relay coil 2—87 is energized upon the actuation of the power supply switch 3—10 to the position 3—12 in which the amplifier as well as the tape driving motor 1—03 are energized.

In the arrangement shown, the amplifier input circuit from the carbon microphone M is completed through the upper contact of the microphone jack 2—81, the closed flexed recording switch contacts 2—89, closed relay contacts 2—86, to one terminal of dry cell 2—85, the other terminal of which is grounded. If a record is to be made from a phonograph pick PU, its plug is inserted into the pickup jack 2—83, thereby flexing its upper spring contact and connecting the phonograph pickup potentiometer 2—84 to the amplifier input circuit instead of the microphone potentiometer 2—82.

The recording amplifier output is delivered through output lead 2—61 to the closed flexed recording switch contacts 2—76, output volume control potentiometer 2—85 and from the tap of a potentiometer by way of a serially connected condenser, through the closed flexed recording switch contacts 2—75, and transducer lead 1—53 to the serially connected transducer coils 1—51, 1—61 and therethrough to ground, the volume control potentiometer 2—85 permitting adjustment of the input to the transducer coils for optimum recording conditions. The additional contact spring of the closed flexed recording switch contacts 2—89 also completes additional D. C. supply circuits from dry cell 2—85 through lead 1—73 by way of current adjusting resistor 1—56 to the serially connected transducer coils 1—51, 1—61, for impressing thereon the polarizing current required for recording, and through current adjusting resistor 1—76 to the obliterating coils 1—71 for impressing thereon the current required for obliterating the previous recording. The circuit from cell 2—85 is prepared by closure of the normally open contacts 2—86 of relay 2—87 when the supply switch 3—10 is actuated to its fully energizing position 3—12.

The recording arrangement described in connection with Fig. 4 enables the user to start a new recording at any time, at any selected point of the moving carrier tape 1—01, by merely actuating the button of recording switch key 3—58 to unlock the synchronizing cam 3—05 which is driven for the duration of one complete revolution by the friction coupling clutch 3—72, while its pointer knob 3—31 indicates on the dial 3—32 the progress of the recording, until at the end of one complete revolution of the synchronizing cam 3—05, the switch key 3—58 is returned by the biasing action of the switch springs into locking engagement with the locking depression 3—50, thereby locking the synchronizing cam 3—05 in the way shown in Fig. 4.

By actuating switch key 3—58 to the unlocking position at a selected point of the travel of the carrier tape, and turning the synchronizing cam 3—05, by means of the pointer knob 3—31, to a selected portion of the dial, for instance, to a point 180° from the normal position, only the next following half of the tape length will be recorded while leaving on the preceding half of the tape length a previously recorded sequence that is to be reproduced. Similarly, a recording operation that has been started, may be stopped at any point of the tape, as indicated on the dial 3—32, by turning the pointer knob 3—31 and returning manually the synchronizing cam 3—05 to its locked position shown in Fig. 4.

Flexible control of the recording and the reproducing operations is thus secured. Upon the completion of each recording the entire recording on the tape is reproduced and the reproduction of the recording on the tape is continuously repeated until a new recording is made.

In Figs. 5 to 8 is illustrated a practical form of a manually operated control arrangement of the type shown diagrammatically in Fig. 4.

The control arrangement 3—03 is part of the chassis of the amplifier 2—01, which is mounted, in conjunction with the frame structure, on which the tape rollers 1—02 and the associated tape driving and guiding elements are mounted inside a housing 9—11. The amplifier chassis has an exposed panel wall 9—12 and the control mechanism is mounted on the panel wall.

One of the tape rollers 1—02 drives through a suitable speed reduction mechanism, such as a flexible shaft 9—13 and a worm gear 9—14 mounted on a control shaft 9—16 of the control mechanism which is revolvably mounted in an opening of the panel 9—12 and a hole of a bracket 9—15 secured to the panel 9—12. The worm gear 9—14 of the flexible shaft is suitably fixed, as by a pin, to the control shaft 9—16 on which is slidingly keyed a friction coupling disc 9—17 which is pressed by a coupling spring into engagement with a control disc 9—18 which is revolvably mounted on the control shaft 9—16, a layer of friction material covering one of the facing coupling surfaces.

The coupling disc 9—18 is provided with a hollow shaft extension 9—19 which is revolvably mounted in the journalling opening of the panel 9—12 and serves as the bearing for the front end of the control shaft 9—16. Oil impregnated washers 9—20, of felt or similar material, are placed adjacent the bearing surfaces of the revolving elements of the control mechanism to maintain the bearing surfaces lubricated and assure quiet operation.

To the projecting stub shaft end 9—19 of the control disc 9—18 is secured a pointer 9—21 which serves also as a grip for rotating the control disc 9—18 relatively to the coupling disc 9—17. A dial 9—22 with a suitable scale is mounted on the panel behind the pointer 9—21, and the reduction gear drive connection between the control shaft 9—16 and its driving roller 1—02 is so proportioned and arranged that when the control disc 9—18 is coupled to the coupling disc 9—17, the control disc 9—18 will make one complete revolution when the guide roller has made the number of revolutions required to pass one complete length of the endless carrier 1—01 through the magnetic head 1—5, while the movement of the pointer 9—21 along the scale of the dial 9—22 indicates the progress of the travel of the complete length of the endless carrier.

The periphery of the control disc 9—18 has a stop notch 9—25 shaped to engage a control rod 9—26 slidably mounted in a bushing 9—27 extending through the panel wall 9—12 so that when the control rod 9—26 is in the position shown, the control disc 9—18 will remain locked in place and will not be rotated by the coupling disc 9—17. On applying pressure to button grip 9—28 of the control rod 9—26 and pushing it inwardly till its annular groove 9—29 releases the control disc 9—18, so that it is now free, the control disc is rotated by the worm-driven coupling disc 9—17. The slowly revolving periphery of the control disc 9—18 engages the groove 9—29 of the control rod 9—26 and holds it in the inward dotted-line position until after one complete revolution of the control disc 9—18 its notch 9—25 releases the control rod 9—26 to its normal outward locking position to which it is biased by the spring blades of the recording switch 2—07 pressing on the switch cam provided on the inward end of the control rod 9—26.

The control rod 9—26 may be arranged for actuation by a flexible push rod extension 9—31 which is enclosed in a flexible tube 9—32 having a coupling collar 9—33 which is detachably coupled to the bushing 9—27, so that by actuating push rod 9—31, the plunger attached to its inner end will actuate the control rod 9—26 to release the control disc 9—18.

Figure 9:
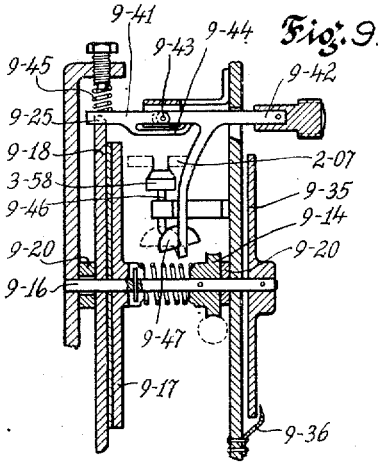
Fig. 9 is a cross-sectional view similar to Fig. 7 of another control mechanism exemplifying the invention.

In Fig. 9 is shown a modified form of control mechanism of the type described in connection with Figs. 5 to 8. A control shaft 9—16 journalled in the amplifier is driven by a worm gear 9—14 in definite correlation to the travel of the endless magnetic carrier 1—01. To the outer end of the control shaft 9—16 is secured a dial 9—35 having a peripheral scale on which a pointer 9—36 mounted on the panel indicates the progressive travel of the endless carrier 1—01.

A control disc 9—18 which is revolvably journalled to a control shaft 9—16 is frictionally coupled to the shaft by a coupling disc 9—17 which is slidingly keyed on the shaft 9—16 and is pressed against the control disc 9—18 by its coupling spring, the several elements being seated on the shaft between oil impregnated felt washers 9—20 to secure quiet and smooth operation of all the moving parts.

The control disc 9—18 may be locked in a stationary position and prevented from rotation by the locking engagement of its peripheral stop notch 9—25 with the lock arm 9—41 of a control lever 9—42 which is pivotally mounted on a pivot pin 9—43 and has a stop 9—44 engaging one side of the control lever 9—42, so that by tilting the control lever 9—42 against the pressure of an adjustably mounted biasing spring 9—45, the lock arm 9—41 may be swung out of its locking engagement with the stop notch 9—25 of the control disc 9—18 to release it and permit it to be rotated by the coupling disc 9—17 in correlation with the travel of the carrier 1—01, while the lock arm 9—41 is held in its unlocked position by the periphery of the rotating control disc 9—18, until after one complete revolution the biasing spring 9—45 returns the lock arm 9—41 into its locking engagement with the control disc 9—18 to stop its further rotation. However, the articulated knee junction between the lock arm 9—41 and its control lever 9—42 makes its possible to return the control lever 9—42 to its normal position shown at any time during the rotation of the control disc 9—18, while the lock arm 9—41 is held in its unlocked position by the periphery of the rotating control disc member 9—18.

As in the arrangement of Figs. 5 to 8, the control lever member 9—42 is utilized to control the operation of the multi-blade recording switch 2—07. To this end, the actuating cam 3—58 of the recording switch 2—07 with its slidably mounted actuating rod 9—46 is arranged to be operated by a cam 9—47 mounted on an extension of the control lever member 9—42, so that upon moving it from its normal locking position shown to the unlocking position in which the control disc is released, for one complete revolution, the lever cam 9—47 will move to the dotted-line position and actuate the switch cam 3—58 to flex the contact blades of the recording switch 2—07 to their recording position. The lever cam 9—47 and the associated elements of the control mechanism are so arranged that the spring forces exerted thereon by the flexed blades of the recording switch 2—07 will lock the lever cam 9—47 in the dotted-line position once the cam 9—47 has been moved from the normal full-line position past the unstable equilibrium position to the unlocking position in which the control disc 9—18 is released for one complete revolution; and to return the control lever 9—42 to its normal position shown once it has been moved on its return path to bring its cam 9—47 on its return path beyond its unstable equilibrium point to its normal full-line position.

By combining a control arrangement of the type shown in Fig. 9 with an endless carrier magnetic recording reproducing apparatus in the way described above in connection with Figs. 1 to 4, the portion of the traveling carrier which passes through the magnetic head is at all times indicated on the revolving dial. When the amplifier and the driving motor are energized, the entire sound sequence recorded on the endless carrier will be continuously repeated as long as the control lever member 9—42 is left in its normal position. To start a new recording on a selected portion of the endless carrier, the recording lever 9—42 is actuated against the pressure of its biasing spring 9—45 to release the control disc cam 9—18 from its engagement with the lock arm 9—41 and to flex the contact blades of the recording switch 2—07 to the recording position. The new recording starts thus simultaneously with the releasing of the control cam 9—18 for one complete revolution, and the full length of the carrier 1—01 passing through the magnetic head 1—5 is recorded during one complete revolution of the dial 9—35.

Upon completion of a recording on the entire length of endless carrier, as indicated by one complete revolution of the dial 9—35, the lock arm 9—41 which has been riding along the periphery of the control cam 9—18 is automatically returned by its biasing spring into the locking slot 9—25 of the control cam 9—18, thereby stopping its rotation, while at the same time the lever arm 9—42 and the switch cam 3—58 are returned to their normal position shown, thereby releasing the contact blades of the recording switch to their normal reproducing position. The apparatus will thereupon repeat the newly recorded sound sequence and continue to repeat it until either the motor is stopped or a new recording is started.

A new recording may be confined to a selected portion of the endless carrier as indicated on the scale of the rotating dial 9—35 by swinging the tilted control lever 9—42 with its lever cam 9—47 from the dotted-line recording position to the normal full-line position, thereby releasing the flexed spring blades of the recording switch 2—07 to their normal reproducing position, while the lock arm 9—41 is still riding along the periphery of the control disc until it is released into the lock notch of the control cam 9—18 at the end of a complete revolution. The return of the control lever 9—42 to its normal position before the control cam 9—18 completes a full revolution enables instantaneous return of the recording switch 2—07 from its recording position to its normal reproducing position so as to confine the new recording only to a portion of the endless carrier as selected by the scale of the revolving dial 9—22. This arrangement enables the student to compare his own new recording on a selected portion of the endless carrier with another specimen recording, for instance, of a phrase recorded by a teacher, or from a phonograph record, or from a radio broadcast, and he may repeat making his own new recording as often as he desires until he is satisfied that he learned to imitate the specimen recording.

The control mechanism of Fig. 9 with the articulated control lever members 9—41, 9—42 for starting and stopping the revolving control cam 9—18 makes it possible to utilize a simple control grip for starting a new recording on a selected portion of the endless carrier while permitting selective stopping of the recording on any selected portion of the endless carrier before its entire length is recorded, so that upon the completion of each recording, the new recording as well as the selectively retained previous recording may be reproduced as many times as desired.

Figure 10:
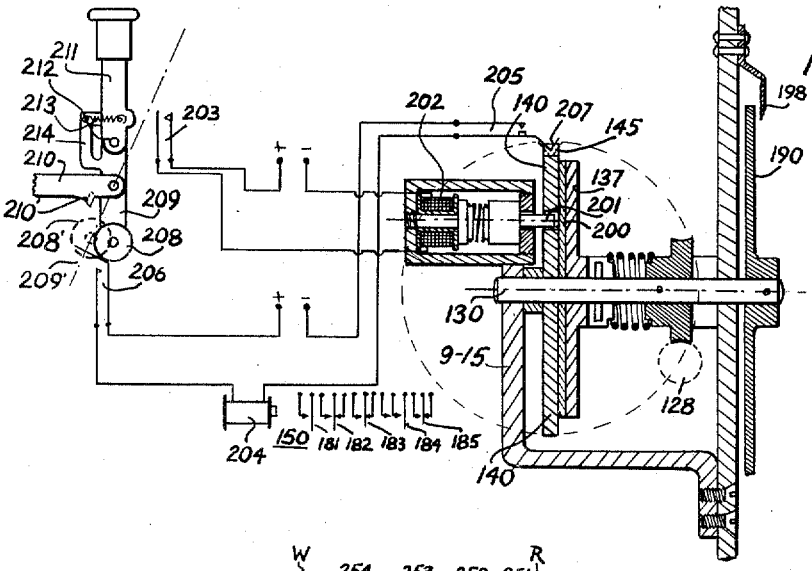
Figs. 10 and 11 are views similar to Fig. 7 illustrating other forms of control arrangements with the associated control circuits.

In Fig. 10 is shown a modified form of a control arrangement for selectively starting and stopping the recording operation on the endless magnetic carrier in a way similar to the arrangement of Fig. 9. It comprises a control shaft 9—16 with an indicating dial 9—35 and a friction coupling 9—17 for selectivly coupling a control cam disc 9—18 to the control shaft 9—16 which is driven by a reduction gear mechanism 9—14 so that one revolution of the dial corresponds to the travel of the entire length of the endless carrier through the magnetic head.

The control disc 9—18 is normally locked in a stationary position through the engagement of its lock hole 9—50 with a lock pin 9—51 of a lock magnet 9—52 arranged to release the control disc 9—18 when the magnet winding is energized from a supply source indicated by plus and minus signs, upon the closure of a normally open contactor 9—53. The recording switch 2—07 with its block of normally unflexed spring contact springs is arranged to be actuated to the flexed recording position by a magnet 2—70 when its windings are energized by the closure of an actuating circuit including the normally open control-cam actuated contactor 9—55 and the normally open control-lever actuated contactor 9—56.

When the control cam 9—18 is in its normal locked position shown, its contactor 9—55 is released to its open cam notch position and it is flexed to the closed position when the control cam 9—18 is released and rotated by the coupling disc 9—17.

The other contactor 9—56 is arranged to be closed by a cam 9—58 of a control level 9—59 pivotally mounted on a bracket so that when the lever 9—59 is tilted to the dotted-line position 9—59', its cam 9—58 closes the contactor 9—56, the cam 9—58 being retained in the contactor closing position by the spring pressure of the contactor blade. A handle 9—61 pivotally joined to the control lever 9—59 and biased by a relatively strong spring against a stop 9—64 of the control lever 9—59 is so arranged that in swinging handle 9—61 to bring the control lever 9—59 to the dotted-line position, the handle 9—61 is tilted until its projecting knob closes the contactor 9—53 and energizes the lock relay 9—52 to release the control disc 9—18. These actions bring about the closure of the two contactors 9—53, 9—56 and the energization of the switch magnet 2—70 which actuates the recording switch 2—07 to the recording position. As soon as the handle 9—61 is released, its biasing spring returns it against the stop of the control lever 9—59, thereby de-energizing the lock magnet 9—52 while the lock pin rides on the surface of the revolving control disc 9—18.

The control arrangement shown in Fig. 10 will operate in combination with an endless magnetic sound carrier in a way similar to the control arrangement of Fig. 9. In the normal reproducing position, the control disc 9—18 is held locked by the lock pin of the lock magnet 9—52; the control disc contactor 9—55 is released to its open position by the control disc notch 9—25; the switch magnet 2—70 is kept de-energized by the open contactors 9—55, 9—56; and the blades of the recording switch 2—07 are in the unflexed normal reproducing position.

To start a new recording on a selected portion of the endless carrier as indicated on the scale of the revolving dial 9—35, the lever handle 9—61 is tilted to close the contactor 9—53 and bring the control lever 9—59 with its cam 9—58 to the dotted-line position, thereby locking the contactor 9—56 and its cam 9—58 in the closed position while the released control disc 9—18 closes its contactor 9—55. As a result, the switch magnet 2—70 is instantaneously energized to actuate the recording switch 2—07 to the recording position and start the recording operation. The new recording starts simultaneously with the release of the control disc 9—18 and the full length of the endless carrier 1—01 passing through the magnetic head 1—5 will be recorded during one complete revolution of the dial 9—35.

Upon the completion of the new recording on the entire length of the endless carrier, the lock pin 9—51 locks the control disc 9—18 in its normal position in which its contactor 9—55 is released to its open position, de-energizing the recording switch magnet 2—70 and releasing its flexed blades to their normal reproducing position.

A new recording may be confined only to a selected fraction of the endless carrier as indicated on the scale of the revolving dial 9—35 by tilting the control lever 9—59 to its normal position shown before the control disc 9—18 has completed a full revolution, thereby de-energizing the switch magnet 2—70 and releasing the recording switch 2—07 to the normal reproducing position, whereupon the new recording as well as the retained previous recording will be reproduced as many times as desired.

Figure 11:
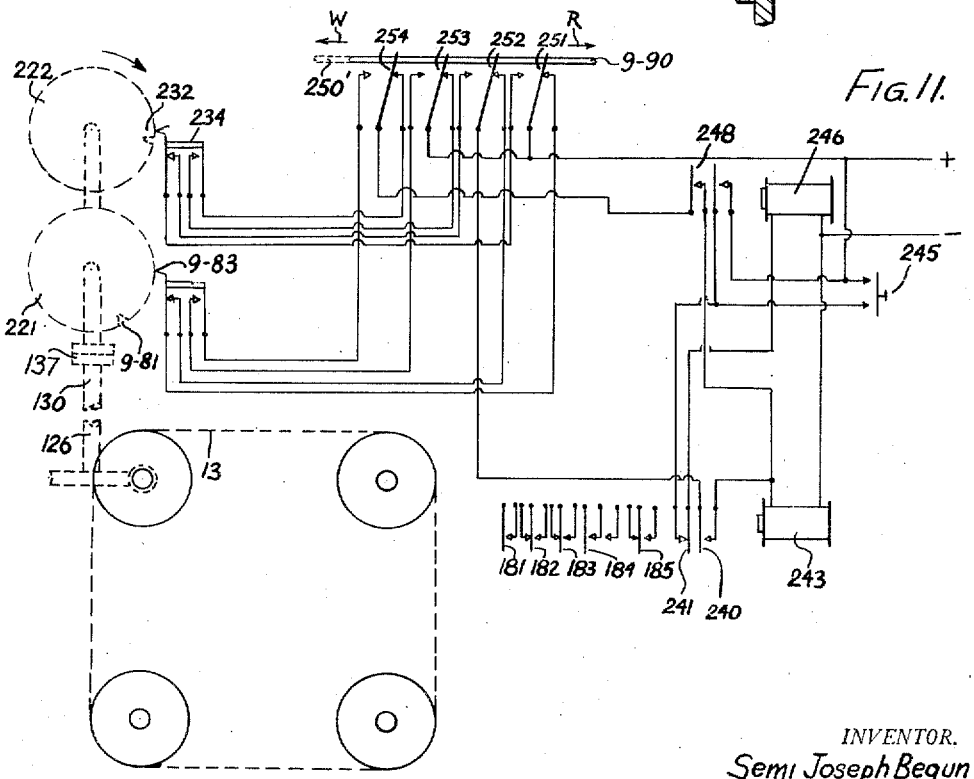
Figure 12:
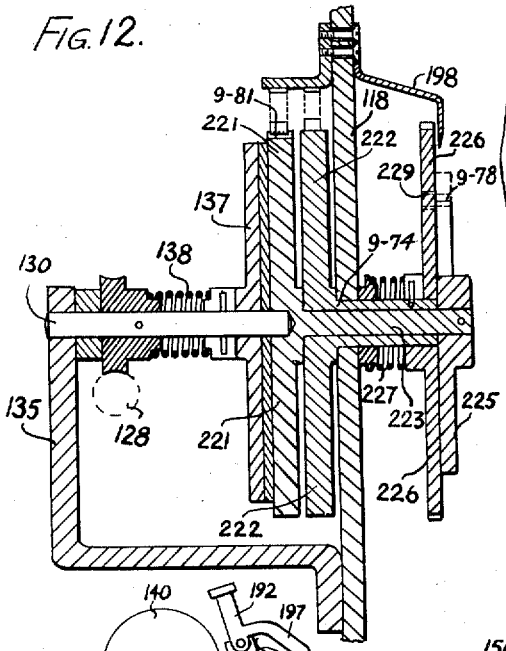
Fig. 12 is a cross-sectional view similar to Fig. 7 of the control device shown in Fig. 11.
Figure 13:
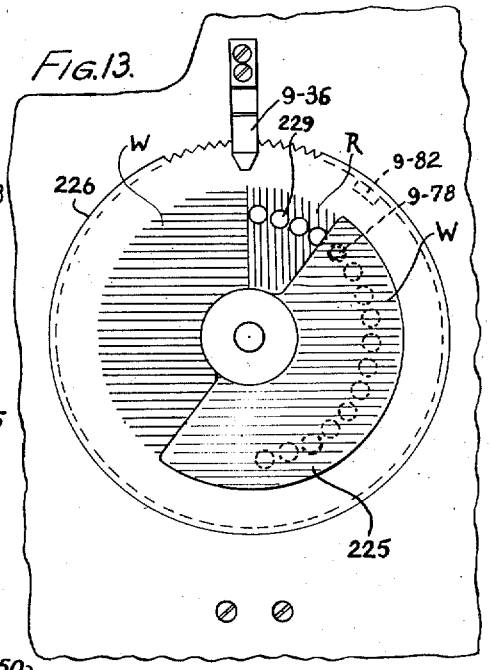
Fig. 13 is an elevational view of the control device of Fig. 12.

In Figs. 11 to 13 is shown another control arrangement for selectively recording only on a portion of the endless carrier. It comprises a revolvably mounted control shaft 9—16 which is driven by a worm drive 9—14 and drives through a friction coupling disc 9—17 to control cam discs 9—71 and 9—72. The control disc 9—71 has a shaft extension 9—73 which is journalled in a hollow shaft extension 9—74 of the second control disc 9—72. The two control discs 9—71 and 9—72 are arranged to be adjustably coupled to each other by a semi-circular coupling plate 9—75 secured to the shaft projection 9—73 of the control disc 9—71 and a coupling plate 9—76 slidingly keyed on the hollow extension 9—74 of the coupling disc 9—72 and pressed by a coupling spring into coupling engagement with the semi-circular coupling plate 9—75.

In the form shown in Fig. 13, the coupling connection is effected by the engagement of a coupling pin projection 9—78 of the coupling plate 9—75 with one of a semi-circular row of coupling holes 9—79 of the coupling plate 9—76. This makes it possible to adjust the angular coupling relation between the two coupling plates 9—75, 9—76 by gripping the knurled edge of the circular coupling plate 9—76 and after pushing it rearwardly to disengage one of its coupling holes 9—79 from the coupling pin 9—78, turn it by the desired angle, and release another of its coupling holes 9—79 into coupling engagement with the coupling pin 9—78 of the semi-circular coupling plate 9—75. Any other simple adjustable angular coupling connection, such as serrated coupling surfaces, may be used instead.

As indicated in Fig. 13 by the shading W and R, one half of the front surface of the coupling plate 9—76 and the front surface of the semi-circular plate 9—75 are of one color, white, for instance, and the other half of the coupling plate 9—76 which has the row of coupling holes is of a different color, red, for instance, so that the exposed red segment of the plate 9—76 indicates at a glance the relative angular coupling displacement between the two control discs 9—71 and 9—72. The two control discs 9—71 and 9—72 are provided with control notches 9—81, 9—82 for controlling the operation of two contactors 9—83, 9—84, respectively, and the angular displacement of the coupling plates 9—75, 9—76 shown by their colored segments indicated the angular displacement of the control notches 9—81, 9—82 of the two control discs.

As shown in Fig. 11, the recording switch 2—07, with its block of spring contact blades and supplemental contact blades 9—85, 9—86, are arranged to be actuated from the normally unflexed reproducing position to the flexed recording position by a switch magnet 2—70 which is energized from a supply source, indicated by plus and minus signs, through an actuating circuit which is controlled by the control disc contactors 9—83, 9—84 and a starting button 9—87 in conjunction with an auxiliary relay 9—88 having normally open contact blades 9—89 and a selector switch 9—90 having contact blades 9—91, 9—92, 9—93, 9—94 cooperating with a set of double throw contacts as shown in the drawings.

The control arrangement shown diagrammatically in Fig. 11 will operate in combination with a magnetic recording and reproducing apparatus such as shown diagrammatically in Fig. 1 as follows: As long as the main motor and amplifier supply switch are closed and the recording switch is in its normal reproducing position, the endless carrier 1—01 and the two control discs 9—71, 9—72 will be continuously driven and the traveling carrier will continuously reproduce all the sound sequences recorded on the endless carrier, while the progress of the reproduction is indicated by the pointer on the dial scale of the continuously revolving coupling plate 9—76. In other words, the reproducing operation proceeds in the same way as in the arrangement described in connection with Fig. 1.

The control discs 9—71, 9—72 which revolve in unison with the travel of the endless carrier through the magnetic head are used for controlling the actuation of the recording switch 2—07 to selectively start or stop the recording on the entire length of the endless carrier or on a selected portion of the endless carrier depending on the position of the selector switch 9—90 and the angular displacement of the control discs 9—71, 9—72 as indicated by the dial segments of their coupling plates 9—75, 9—76. If the selector switch 9—90 is in the position shown in Fig. 11, indicated by the arrow R, a new recording started by the closure of the button switch 9—87 will be confined to the portion of the endless carrier corresponding to the red segment R of the dial plates 9—75, 9—76. If, on the other hand, the selector switch 9—90 is in the other position, indicated by the arrow W, a new recording started by the closure of the button switch 9—87 will confine the new recording to the portion of the endless carrier corresponding to the white segment W of the dial plates 9—75, 9—76. The simple angular adjustment of the coupling connection between the two control discs 9—71, 9—72, as indicated by the colored dial plate segments, in conjunction with the simple actuation of the selector switch 9—90, make it thus easy to control the selective recording on selected portions of the carrier.

Thus, if a new recording is to be made on the portion of the endless carrier indicated by the red segment of the dial plates 9—75, 9—76, the selector switch 9—90 is placed in the position indicated by the arrow R as shown in Fig. 11. Thereupon, each time a new recording confined to this selected portion of the endless carrier is to be made, the user has merely to close starting switch 9—87 for a moment. This completes an energizing circuit for the starting relay 9—88 which is connected to the minus terminal, from the plus terminal of the relay supply, through the closed starting switch 9—87, and the blade 9—86 of the recording switch 2—97. The energization of the starting relay 9—88 completes a locking circuit at its inner contracts, and it remains locked until its locking circuit is opened at the contact blade 9—86 of the recording switch 2—97 when the recording switch relay 2—70 is energized. The closed starting relay contacts 9—89 prepare an actuating circuit for the recording switch magnet 2—70 leading from the minus supply terminal, through the winding of magnet 2—70, by way of the closed selector switch contacts 9—94 to the open contacts of the control disc switch 9—84, and therefrom through the closed selector blade contacts 9—93 to the plus supply terminal, the circuit being completed when the notch of the revolving control disc 9—82 releases its contactor 9—84 from its flexed position and through the energization of the recording switch magnet 2—70 actuates the recording switch to start the recording operation.

The energization of the recording switch magnet 2—70 effects also the closure of its lock-in contacts 9—85 which complete its lock-in circuit leading from the positive supply terminal through the closed selector contacts 9—91, the closed contacts of the control disc contactor 9—83, the closed selector switch contacts 9—92, the closed relay lock-in contacts 9—85 and the winding of the recording switch magnet 2—70 to the negative supply terminal. At the same time, the energization of the recording switch magnet 2—70 opens at its contacts 9—86 the lock-in circuit of the starting relay 9—88 and thereby returns its contacts to their normal open positions.

The recording operation, which was thus started when the control disc switch 9—84 was momentarily released from its flexed position into notch 9—82 of the revolving control disc cam 9—72, will now continue until, as indicated by the motion of the red dial segment past the pointer 9—36, the notch 9—81 of the revolving control disc 9—71 releases its associated contactor from its flexed position, thereby breaking at its normally closed contacts the lock-in circuit of the recording switch magnet 2—70, and by the resulting de-energization of the recording switch magnet 2—70 returns the recording switch 2—97 to its normal reproducing position.

The user will then hear the reproduction of the retained part of the previous recording, as indicated by the white part W of the dial, followed by the reproduction of his new recording, as indicated by the red part of the scale. He may make new recordings and hear the retained recording and his new recordings as many times as he desires by merely pressing the button of the starting switch 9—87 each time he desires to make a new recording.

By moving the selector switch 9—90 to the opposite position, in the direction of the arrow W, any new recording started by the momentary closure of the starting switch 9—87 will be confined to the length of the endless carrier corresponding to the white segment W—W of the dial, and once the new recording is made, the retained sound sequence corresponding to the dial segment R with the newly recorded sequence corresponding to the segment W will be continuously repeated until a new recording is substituted for the last recording on the length corresponding to the segment W of the dial. Once the starting switch 9—87 is momentarily closed, the apparatus will be automatically switched over for recording when the front edge of the white segment area of the revolving dial reaches the pointer 9—36 and the recording period will be automatically stopped when the rear edge of the white segment reaches the pointer 9—36, whereupon both recorded sequences of the endless carrier will be continuously repeated until a new recording is to be made on the portion of the endless carrier corresponding to the white segment of the revolving dial.

This arrangement makes it thus possible to apportion one length of the carrier for recording thereon a model sentence or paragraph, for instance, by a teacher, which should remain on the endless carrier for a substantial period of time, while reserving for the pupil the remaining portion of the endless carrier for repeatedly making his own recordings until he is satisfied that his own recording approaches the standard of the model recording. With such arrangement, once the teacher has made a model recording on one section of the endless carrier as indicated on the dial, he merely has to throw the changeover switch into the other position, whereupon the pupil may make as many recordings as he desires on the portion of the endless carrier reserved for him until he has completed his training.

Although the friction coupling connection between the control shaft 9—16 and the control disc 9—18 is not required for the operation of the control arrangement of Figs. 11 to 13 in the way described above, this friction coupling makes it possible to independently turn the intercoupled control discs 9—71, 9—72 relatively to the coupling plate 9—17 for independently selecting the portion of the endless tape upon which the new recordings are to be started.

Figure 14:
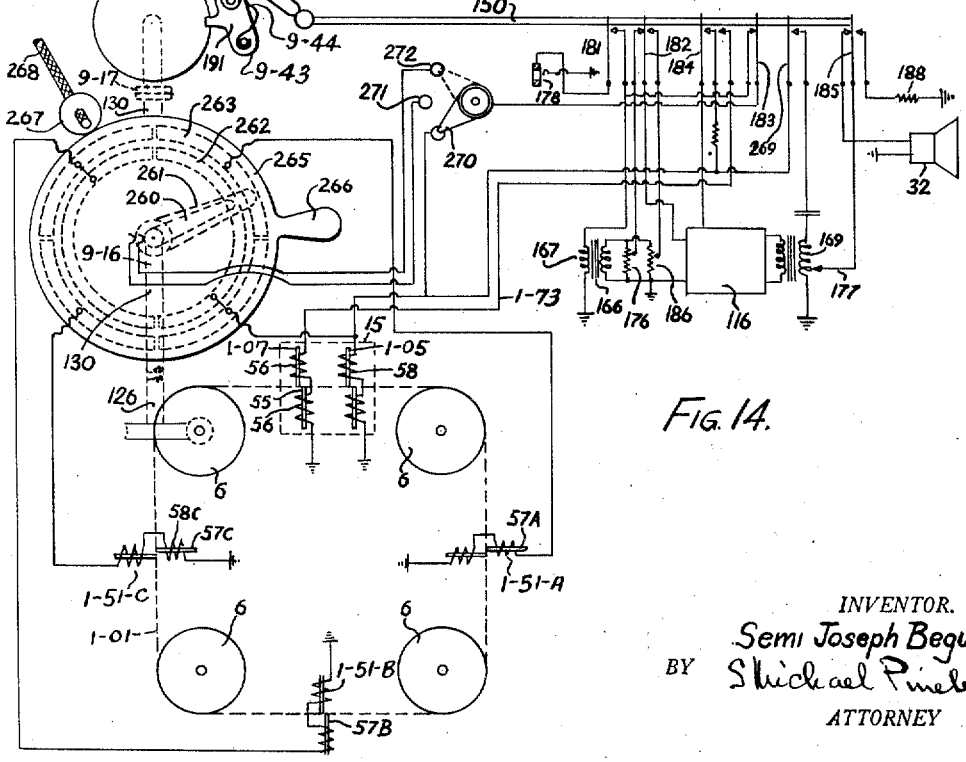
Fig. 14 is a diagram illustrating another control arrangement for the recording system of the invention.

In Fig. 14 is shown another type of control arrangement of the invention which makes it possible to continuously reproduce only a selected sound sequence recorded on a selected portion of the total length of the carrier without repeating the sound recorded on the remainder of the endless carrier. Such arrangement is desirable, for instance, if the endless carrier has a length sufficient for recording a long sound sequence and the user desires to play back only a selected short sound sequence, such as a single sentence.

An endless carrier 1—01, which is driven at a uniform speed along a plurality of guide rollers 1—02 has, in addition to a main magnetic head 1—5 with obliterating magnets 1—07 and transducer magnets 1—05, several additional sets of transducer magnets 1—05—A, 1—05—B, 1—05—C, located at different selected points along the path of the endless carrier. To simplify the description, the four sets of transducer magnets are shown spaced from each other by one-quarter of the total length of the carrier.

The recording and reproducing operations are controlled by a control mechanism which comprises a control shaft 9—16 which drives through a friction coupling disc 9—17 a control disc cam 9—18 so that when the control disc 9—18 is released, it will make one revolution while the entire length of the endless carrier passes through the magnetic head. The control disc 9—18 cooperates with an articulated control lever arrangement 9—41, 9—42 of the type shown in connection with Fig. 9 for selectively actuating a recording switch 2—07 to start a new recording operation on a selected portion of the endless carrier and to automatically stop the recording operation and start the reproducing operation after one complete revolution of the control disc 9—18, or to stop the recording operation by actuating the lever handle 9—42 to release the switch 2—07 from its recording position while the lock member of the control lever 9—41 is still riding on the periphery of the revolving control disc 9—18 in the way explained in connection with Fig. 9. If desired, the fully automatic control arrangement of Fig. 11 may be used for controlling the recording operation.

The control shaft 9—16 is arranged to revolve a pair of contact wiper arms 10—11, 10—12 along insulatingly mounted segments of the split contact rings 10—13, 10—14 of a rotary switching device 10—10. The switching device 10—10 may be angularly revolved, as by means of a handle or a friction roller 10—15 operated through a flexible shaft so as to permit adjustment of the phase relation of the contact segments 10—13, 10—14 with respect to the moving endless carrier 1—01.

A switch 10—16 having a blade movable between the position shown, in which it completes a circuit connection to the lead 1—53 connected to the transformer windings of the magnetic head 1—5, and two other positions, in which it completes circuit connections to the switch wipers 10—11 and 10—12, respectively, is associated with the rotary switching device 10—10 in performing the control operations. An amplifier 2—00 and a recording switch 2—07 are arranged to establish the reproducing circuit connections to normally play back a recording made on the endless tape, and to selectively establish the recording circuit connections when the control switch is actuated by the control lever 9—42 to flex its blades from the the normally biased reproducing position to the flexed recording position.

Further details of the control arrangement of Fig. 14 will be clear from a description of its operation. It is assumed that the driving motor, not shown, has been energized to drive the endless tape on which a recording has been made, and that the operating circuits are in the condition shown in the figure.

In this position, the following circuits are established for reproducing from the transducer windings of the magnetic head 1—5: An amplifier input circuit from the transducer windings 1—51, one side of which is grounded, to the closed contacts of the selector switch 10—16, recording switch blade 2—75 to the primary side of the input transformer 10—17, and from the tap of the volume control potentiometer 10—18 connected thereto, through the unflexed recording switch blade 2—72, to the input lead 2—10 of the amplifier, the amplified output being delivered through output lead 2—61, by way of the recording switch blade contacts 2—76, to the reproducer R.

Accordingly, the previously made recording from the entire length of the endless tape 1—01 will be reproduced. To make a recording, the recording control lever 9—42 is actuated to release the cam 9—18, thereby actuating the blades of the recording switch 2—07 to the flexed recording position in which they are maintained for one full rotation of the control disc 9—18.

In this flexed recording position, the flexed blades of the recording switch 2—07 break the reproducing circuit connections and establish the following recording circuit connections: A recording amplifier input circuit from the amplifier input jack 2—81, the closed flexed recording switch blades 2—71, to the primary winding of the input transformer 10—17, and from the secondary winding of the input transformer 10—17, through a tap of the recording volume control potentiometer 10—19, the closed flexed contacts of the recording switch blade 2—72, to the input lead 2—10 of the amplifier 2—00. The recording output is delivered through amplifier recording output lead 2—59, the closed flexed recording switch blades 2—78 and lead 1—53, to the serially connected transducer windings 1—51, 1—61 to ground.

At the same time, there is also supplied a D. C. obliterating current from the positive supply lead 1—76 extending from the D. C. filter network of the amplifier, through the flexed closed contacts of the recording switch blade 2—74, to the lead 1—73 the obliterating coils 1—71 of the magnetic head 1—5, the flexed recording switch blade 2—74 also completing a circuit connection from the D. C. supply lead 1—76, by way of current adjusting resistor 1—56, to the lead 1—53 connected to the transducer coils 1—51 of the magnetic head 1—5 for superimposing on the recording A. C. currents the required D. C. polarizing current. Accordingly, the apparatus will be in the recording condition and enable the making of a recording on the entire length of the tape by means of the magnetic head 1—5.

The provision of the rotary switching device 10—10, the wipers of which are revolved in synchronism with the movement of the tape, and the associated selector switch 10—16, makes it possible to selectively confine the play-back from the recording so made on the tape to only a portion of the tape. Thus, by moving the selector switch 10—16 to the position in which it completes a circuit from the recording switch blade 2—75 to the rotary wiper 10—11, the revolving wiper 10—11 will, during each full revolution, successively engage the four segments of the contact ring 10—13 leading to the four sets of the transducing coil windings 1—51, 1—51—A, 1—51—B, 1—51—C, thereby successively connecting another transducing winding to the input side of the amplifier during each revolution of the wiper. As a result, the rotating wiper 10—11 will, after each quarter of a revolution of the control shaft, establish circuit connections for playing back the same sequence recorded on a quarter of the length of the endless carrier, without playing back the record made on the remaining three-quarters of the endless carrier.

In a similar way, when the arm of the selector switch 10—16 is moved to the position in which it completes a circuit to the selector switch wiper 10—12, the latter will, in the course of each revolution, establish successive engagement with the contact segments 10—14 connected to the transducer input windings 1—51 and 1—51—B for successively playing back the recording on one selected half of the endless carrier, without playing back the record on the other half of the carrier.

This arrangement enables the user to start the reproduction of a sound sequence on a selected portion of the moving endless carrier as indicated on the dial by turning the switching device 10—10 either by the handle or by the remote control drive 9—16 to the desired angular position. After the switching device 10—10 has been turned to the right position, the selected sound sequence will be continuously reproduced without reproducing the other parts of the recorded sound.

By providing a selector switch 10—16 with a larger number of selector contacts and a corresponding wiper switch 10—10, the reproducing process may be confined to any selected fraction of the endless carrier and the user may quickly select any desired short part of the endless carrier for reproducing.

Figure 15:
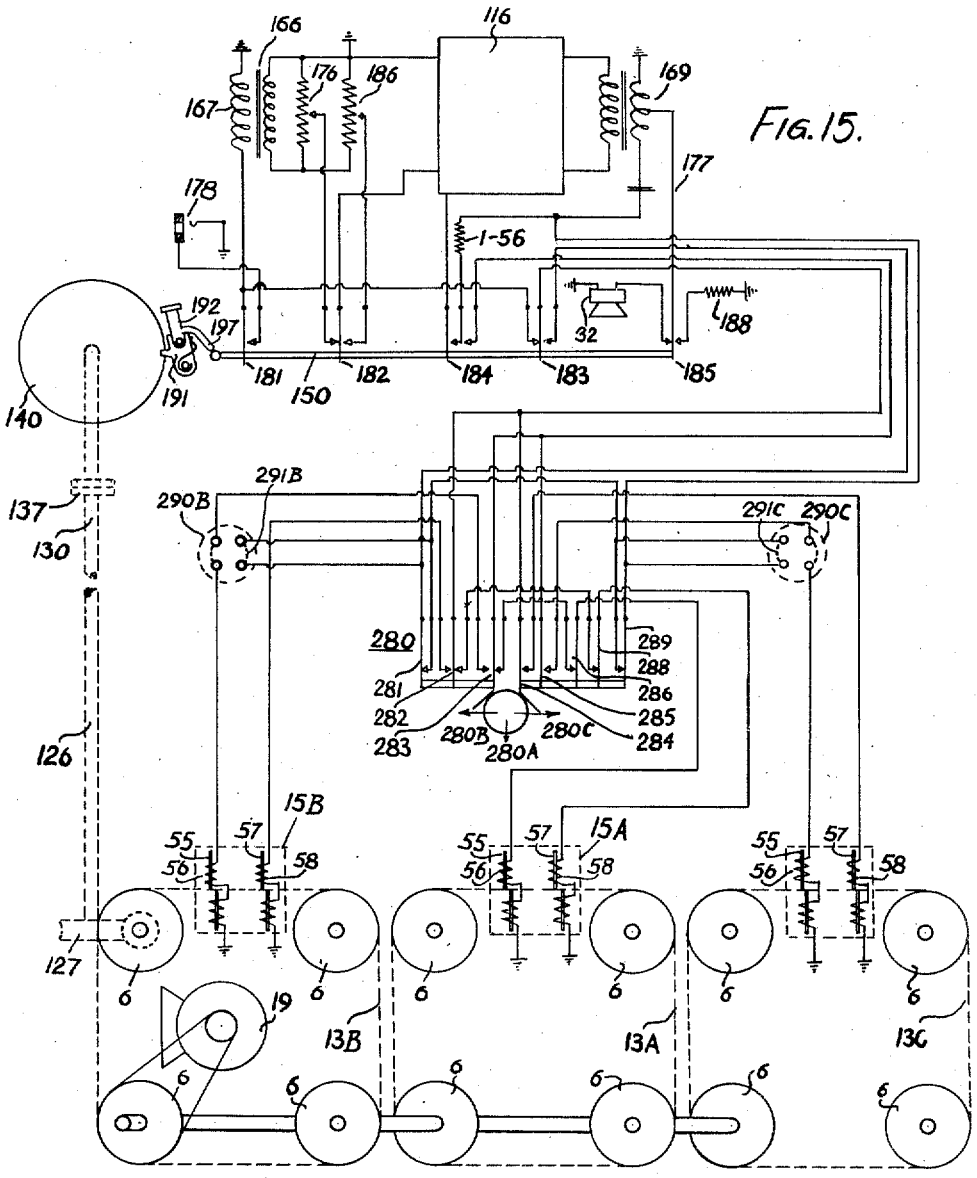
Fig. 15 is a circuit diagram of another control arrangement for a recording apparatus of the invention.

Fig. 15 shows how the recording control mechanism of Fig. 14 is applied to such apparatus. A control cam 9—18 is driven through a friction coupling drive at a speed correlated to the travel of the endless carriers, and an articulated control lever 9—41, 9—42 associated with the control cam 9—18 controls the operation of the recording switch 2—07.

A key-operated multi-blade selector switch 10—20 may be actuated by a cam movable from the neutral position shown in the drawings for selectively confining the recording or reproducing operations to the endless carrier 1—01—A or to the positions indicated by the arrows B, C for recording and reproducing sound on the endless carriers 1—01—B or 1—01—C.

When the selector switch 10—20 is in its position shown in the drawings, the following circuit connections for reproducing and recording connections by means of the sound carrier 1—01—A are established: The obliterating winding 1—71 of the magnetic head 1—5—A is connected through selector switch blades 10—26 and 10—23 to a contact of the recording switch blade 2—74 through which a magnetizing current is supplied during a recording operation; the transducer winding 1—51 of the magnetic head 1—5—A is connected through selector blades 10—28 and 10—22 to the center contact of the recording switch blade 2—75 through which the transducer winding is connected either to the amplifier input winding 2—10 for reproducing or to the output transformer winding 2—52 for recording, while the recording switch blade 2—74 supplies through resistor 1—56 the depolarizing current to the transducer windings 1—51.

Accordingly, as long as the selector switch 10—20 is in its neutral position, the transducer and obliterating coils of the magnetic head 1—5—A will operate in conjunction with the amplifier 2—00 under the associated recording control arrangement to selectively reproduce or record sound on the tape as in the arrangements of Fig. 1 or 9.

When the selector switch 10—20 is actuated to the position indicated by the arrow B, its flexed blades break at the contacts 10—21, 10—22, 10—23 the recording and reproducing connections to the magnetic head 1—5—A of the endless carrier 1—01—A, and establishes the following reproducing and recording connections to the magnetic head 1—5—B of the carrier 1—01—B: Its obliterating coil 1—71 is connected over the closed lock-out switch 10—31 through the flexed selector blade 10—23 to the outer contact of the recording switch blade 2—74, through which a magnetizing current is supplied during the recording operation; and its transducer coil 1—51 is connected through the flexed selector blade 10—22 to the recording switch blade 2—75, through which the connection is completed to the input lead 2—10 of the amplifier for reproducing sound from tape 1—01—B, or in the flexed recording switch position, through the closed lock-out bypass contacts 10—32, by way of the unflexed selector contacts 10—29, to the amplifier output lead 2—63 for recording sound on the tape 1—01—B.

When the selector switch 10—20 is flexed to the position indicated by arrow C, it breaks at the flexed blades 10—28, 10—29 the recording and reproducing connections to the magnetic head 1—5—A of the endless carrier 1—01—A, and establishes the following reproducing and recording connections for the magnetic head 1—5—C of the endless carrier 1—01—C. Its obliterating coil 1—71 is connected over the closed lock-out contacts 10—33, through the flexed selector blade 10—25 to the recording switch blade 2—74, through which a magnetizing current is supplied to the obliterating coil during the recording operation; and its transducer coil 1—51 is connected through the flexed selector blade 10—24 to the recording switch blade 2—75 through which the connection is completed either to the input lead of the amplifier for reproducing sound; or in the flexed recording switch position, by way of the unflexed selector contact 10—21 and the lock-out bypass contacts 10—34 to the amplifier output lead 2—63 for recording sound on the magnetic tape 1—01—C.

The arrangement described above in connection with Fig. 15 makes it thus possible to selectively reproduce or record on either one of a plurality of magnetic carriers. By a simple manual or remote-control actuation of the selector switch 10—20, either one of the several magnetic carriers may be connected for recording and reproducing sound in conjunction with a common amplifier 2—00 under the utilization of one of the various recording control arrangements described hereinabove.

The two sets of lock-out contacts 10—31, 10—32 and 10—33, 10—34 are associated with the circuits to the tapes 1—01—B and 1—01—C, respectively, and are so arranged that the opening of one set of lock-out contacts disables the recording circuit connections of the respective magnetic heads, so that as long as a lock-out switch is open, it is only possible to reproduce, and it is impossible to record on the particular tape. The lock-out switches may have the form of removable plugs, or may be key operated so as to prevent recording as long as they are locked in the open position.

A sound recording and reproducing apparatus of the type described above opens special possibilities for studying languages. Before starting to study, a model sound sequence may be recorded on one of the three sound carriers, for instance, the tape 1—01—B. After the model recording is made and the teacher, for instance, is satisfied that it will serve as a good model for the student, the teacher locks the lock-out switch of tape 1—01—B, preventing obliteration of the record by the student while he compares his repeated own recordings on the tape 1—01—A with the locked-in model recording of the teacher. In the third tape 1—01—C, the student may record his first original attempt to imitate the model sound sequence of the teacher and leave it locked thereon, so that he may compare it with his repeated later recordings of the model sound sequence on the practice tape 1—01—A, and thus observe his progress in learning to imitate the model sound sequence locked on tape 1—01—B. With the teacher's model and his own original recording thus safely preserved on the tapes 1—01—B and 1—01—C, the student is able to make quick progress by repeating and listening in to his own recordings on the tape 1—01—A and comparing them with the preserved recordings on the other tapes.

A simple turn of the key of the selector switch 19—20 enables him at any time to listen in to the model sentence or to his own original record on the other two tapes. He may continue to make as many new recordings of the model sentence on the practice tape 1—01—A until he is satisfied that he has overcome the faults of his original record and that he has learned to master the characteristics of the model recording. While the student is thus able at any time to make new recordings on the tape 1—01—A which remains fully operative both for recording as well as reproducing, he cannot while studying make a new recording or obliterate the recordings on the lock-out tapes 1—01—B and 1—01—C which preserve the teacher's model recording and his own original imitation of the teacher's model sound sequence.

Obviously, the recording and reproducing apparatus of the type described in connection with Fig. 15 is not limited to the use of three traveling carriers, and depending on the various applications of such apparatus, any number of distinct magnetic sound carriers may be arranged and combined for many other applications depending on their particular requirements.

The various control arrangements and methods described above in connection with endless magnetic recording media are also applicable to magnetic recording media, such as wires or tapes, that are moved back and forth between spools on which they are wound and stored.

Figure 16:
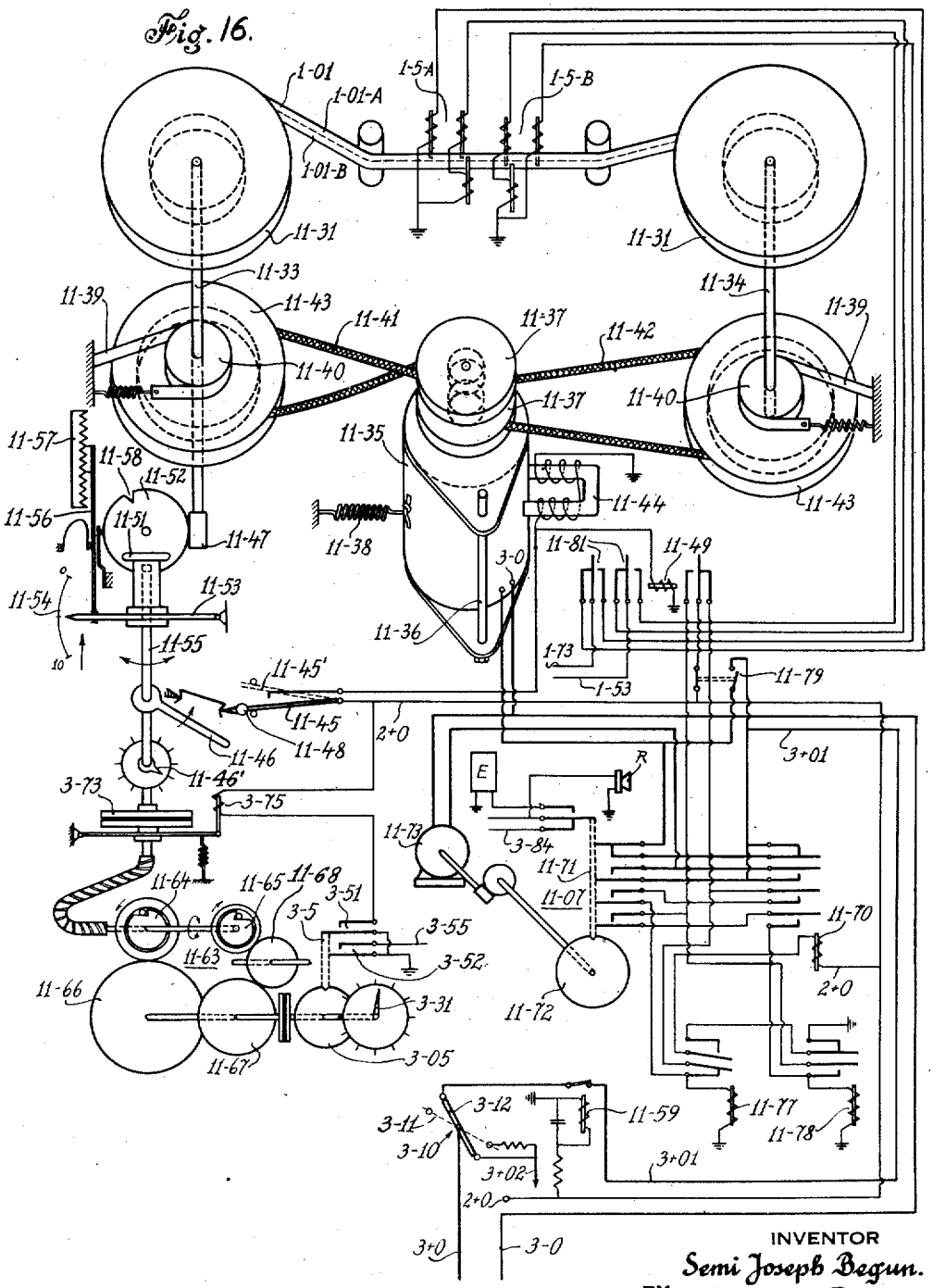
Fig. 16 is a diagrammatic view of another form of recording and recording control arangement of the invention.

Fig. 16 shows diagrammatically a spool-type magnetic recording apparatus utilizing one or more pairs of magnetic record carrier tracks which are arranged to be moved back and forth through transducing pole pieces associated with each of the magnetic tracks for consecutively recording first on one of a pair of magnetic tracks, while they are impelled in one direction, and then on the other track while they are impelled in opposite direction, and to consecutively reproduce the recording made on each magnetic track as they are consecutively impelled in opposite directions.

In other words, a pair of magnetic recording tracks arranged to continuously reproduce as they are moved back and forth, operate in the same way as an endless magnetic recording track, and the operating cycle consisting of such back and forth movement or transporting of a pair of magnetic tracks is effectively equivalent to the operating cycle of a complete length of an endless magnetic tape of the type shown in Fig. 1, for instance.

Two magnetic recording tracks 1—01—A, 1—01—B, either in the form of separate magnetic tapes, or, as shown, forming parts of a single magnetic tape 1—01, are wound in the form of coils on two spools or reels 11—31, mounted on suitably journaled spool shafts 11—33, 11—34.

The two spool shafts are driven by a driving mechanism which is so arranged that during one-half of each operating cycle, the record tracks are wound on one spool shaft, and that during the other half of each operating cycle, the record tracks are wound on the other spool shaft.

The driving arrangement of Fig. 16 thus assures that when the motor is deenergized, the two spool shafts 11—33, 11—34 are subjected to a braking action holding the tape under tension and opposing unreeling of the tape. When the motor 11—35 is energized, while the motor solenoid 11—44 is deenergized, the motor will remain in the position shown and drive spool shaft 11—34 through belt 11—42 to wind thereon the tape in clockwise direction, the other spool shaft 11—33 being uncoupled from the motor and being subjected to the braking action of its brake 11—39 which keeps the tape under tension as it is being unreeled therefrom in clockwise direction; and upon energization of the motor solenoid 11—44, the motor will be tilted to the opposite position, in which it loosens its belt coupling connection to spool shaft 11—34 and drives through cross-belt 11—41, in a similar way, spool shaft 11—33 to wind thereon the tape in counter-clockwise direction, while the braking action to which the other spool shaft 11—34 is subjected keeps the tape tight and opposes its being unreeled therefrom in counter-clockwise direction.

In the form shown, the tape tracks 1—01—A, 1—01—B are associated with two magnetic heads 1—5—A, 1—5—B, respectively, so as to record on, or play back from, tape track 1—01—A when the two tape tracks are wound on spool shaft 11—34, and to record on, or play back from, tape track 1—01—B when the two tape tracks move in reversed direction, as they are wound on spool shaft 11—33.

There is also provided a synchronizing arrangement for automatically controlling the motor drive to periodically reverse its driving connection to the spool shafts at the end of each half operating cycle, that is, after the desired length of the tape track on which a recording is made has been fully wound on one or on the other spool shaft.

In the form shown, the synchronizing arrangement comprises a switch 11—45 which at the end of each half operating cycle is actuated by a synchronizing mechanism 11—46 from one position to the other, for instance, from the position shown, in which its contacts are open, to the opposite position in which its contacts complete an energizing circuit from the relay supply lead 2+8 to the winding of the motor magnet 11—44, and thereby periodically reverse the direction in which the motor 11—35 drives the tape tracks.

For the sake of simplicity, the synchronizing mechanism 11—46 is shown formed of an oscillating arm mounted on a shaft 11—55 which is driven through a speed reducing worm gear drive 11—47 by spool-shaft 11—33, so that during one half cycle, for instance, while the motor drives the spool shaft 11—34 to wind thereon the full operating length of the tape, the oscillating arm 11—46 is moved from the position in which it actuates the synchronizing switch 11—45 from one position to the opposite position, and thereby reverse, at the end of each half operating cycle, the direction in which the tape is driven.

Since the motion of the oscillating arm 11—46 is very slow, the synchronizing switch is designed to operate abruptly. Any abrupt acting switch in which the switch contacts are actuated from one position to the other by a spring constrained so that by imparting a slight motion to a portion thereof, another portion thereof will move abruptly and actuate the circuit opening contacts from the closed position to the open position and vice versa, of the type described in U. S. Patent 1,780,758, for instance, may be used.

For the sake of simplicity, the switch 11—45 is shown in the form of a switch blade having one end pivoted on a suitable support and having at its other end a knife edge against which is pressed one arm of a constrained U-shaped spring, the other arm of which is pivotally held on a fixed support, such as an adjusting screw so that by moving the switch blade past the neutral, unstable-equilibrium position, it will snap either to the full-line position or to the dotted line position 11—45'. The switch blade has a projecting pin 11—48 that is engaged by the oscillating arm 11—46 at the end of its oscillatory path, so as to tilt the switch blade 11—45 just past its neutral position at the end of each half operating cycle.

Various ways may be employed for utilizing a synchronizing mechanism, such as shown at 11—46, 11—47, for controlling the motor drive to drive the tape in opposite directions. In the form shown in the drawings, the synchronizing switch 11—45 is utilized for controlling, at the end of each half cycle, the tilt imparted to the driving motor, which rotates at all times in the same direction, and thereby reverse the direction of the driving motion imparted to the tape 1—91.

In the form shown, the several elements of the synchronizing arrangement are so designed that at the end of its clockwise oscillation, the oscillating arm 11—46 shall actuate the toggle switch 11—45 from the closed to the open position, and thereby actuate the driving motor to wind the tape on spool shaft 11—34, and that at the end of its counterclockwise oscillation, the oscillating arm 11—46 shall actuate the toggle switch 11—45 from the open to the closed position and thereby actuate the drive motor 11—35 to wind the tape 1—91 on spool shaft 11—33.

The magnetic tape tracks 1—91—A, 1—91—B are arranged to cooperate with an amplifier arrangement and a recording control arrangement of the type described in connection with Figs. 1 to 3 for recording or reproducing in conjunction with the magnetic head of tape track 1—91—A when it is being wound in one direction on spool shaft 11—34 and in conjunction with the magnetic head associated with tape track 1—91—B when it is wound in opposite direction on spool shaft 11—33.

In the form shown, the periodical operation of synchronizing switch 11—45 at the end of each half cycle is utilized to operate a signal circuit relay 11—49 to control the interconnections between the amplifier circuits and the windings of the two magnetic heads 1—5—A, 1—5—B.

In the open position of the synchronizing switch 11—45, during one half of the operating cycle, the left hand contacts of the relay 11—49 complete circuits from the transducer windings 1—51 and obliterating windings 1—71 of magnetic head 1—5—A to the leads 1—53, 1—73, respectively, through which the recording switch 2—97 establishes the circuits for recording or reproducing in conjunction with tape track 1—91—A while the tape is wound on spool shaft 11—34; and during its other half cycle, the closed synchronizing switch 11—45 energizes relay 11—49 and flexes its left hand contacts to break the circuits from magnetic head 1—5—A and establishes similar circuits to magnetic head 1—5—B for recording or reproducing in conjunction with tape track 1—91—B while the tape is wound on spool shaft 11—33.

In such recording apparatus, it is very desirable to know the portion of the tape track on which a recording is being made or from which a recording is being reproduced. In the form shown in Fig. 16, such indication may be supplied by an index arm 11—55' which is actuated by the shaft of the oscillating arm 11—46 to indicate on a dial the progress of the reproducing or recording process as it proceeds on the two tape tracks.

In many applications requiring repeated playback of a message, it is very often important to provide facilities for increasing or decreasing the length of the play-back or recording cycle, or, in general, the operating cycle. A magnetic recording apparatus using reversibly driven magnetic tape tracks for playing back the recording on both tracks may be combined with a cycle control mechanism for enabling selective control of the length of the operating cycle. The synchronizing mechanism 11—46, 11—47 is shown utilized as a part of such cycle control arrangement. Any arrangement for varying the speed at which the synchronizing mechanism 11—46, 11—47 is moved to its different operating positions in relation to the speed imparted by the tape tracks may be used for such cycle control arrangements.

For the sake of simplicity, such cycle control arrangement is shown formed of a friction pulley 11—51 slidably keyed on the shaft 11—55 of the synchronizing arm 11—46 and arranged transversely to the radial direction of the face of a driving disc 11—52 forming part of the speed reduction gearing 11—47 so as to impart to the synchronizing arm 11—46 an oscillatory motion having a time period determined by the position of engagement between the transverse pulley 11—51 with the driving disc 11—52. The position of the driving engagement may be varied by shifting the pulley 11—51 along its shaft, for instance, by a pivotally mounted lever 11—53 engaging a collar groove formed on the pulley 11—51.

By shifting the transverse pulley 11—51 nearer or farther away from the center of the driving disc 11—52, the oscillatory movement imparted to the oscillator arm 11—46 may be decreased or increased. Such simple cycle control arrangement make it possible to control the length of the recording or reproducing cycle on one or more of reversely driven magnetic recording tape tracks.

In such recording arrangement, it is also desirable to know the effective length of the operating cycle either in terms of the time or the operating length of the tape tracks that is being used.

In the form shown, such indication is obtained by utilizing the lever 11—53 of the cycle control mechanism for indicating on a suitably calibrated scale 11—54 the length or duration of the operating cycle. For proper operation of such indicating arrangement, it is important to provide a locking arrangement which makes it impossible to change the effective operating length of the tape tracks during the progress of a recording or play-back operation, and permits the making of such change only at a predetermined point of the operating cycle.

In the form shown, the locking arrangement is designed to assure that the change of the length of the operating cycle can be made only when the entire available length of the type tracks is wound on the spool shaft 11—33. Such locking arrangement may be formed, for instance, by providing the operating lever 11—53 with a locking arm 11—56 having locking teeth which are pressed by its cam follower into locking engagement with a toothed locking bar 11—57 as long as its cam follower engages the outer cam periphery of the driving disc 11—52, so as to keep the lever 11—53 and its pulley 11—51 locked against transverse movement.

The cam periphery of the driving disc 11—52 has a cam depression 11—58 into which the suitably biased locking arm 11—56 is released to unlock the lever 11—53 and permit adjustment of the speed ratio of the mechanism 11—51, 11—52 only when the lever is in the position when the full available length of the tape tracks has been wound on spool shaft 11—33.

In the form shown, the locking arm 11—56 has a certain amount of resiliency and all the elements of the locking mechanism are so designed and proportioned as to permit its biasing spring to press the locking arm out of its locking engagement into the released cam depression position only when the full length of the tape tracks that can normally be unreeled from spool shaft 11—34 on spool shaft 11—33 is wound thereon, and to assure that the locking arm will be actuated into its locking engagement with the locking bar promptly after a portion of the tape has been unreeled from spool shaft 11—33 and wound on spool shaft 11—34 during the next following operating cycle, and that it shall remain locked during the full length of an operating cycle and until the full effective length of the tape tracks has been wound on the spool shaft 11—33.

A locking arrangement of the foregoing type assures that the length of the tape cycle can be adjusted only in a predetermined operating condition of the tape driving mechanism. It eliminates the difficulties that might otherwise arise if, for instance, the length of the operating cycle is increased to the full length of the tape tracks while half of the tape tracks is wound on one spool and the other half on the other spool, since under such conditions, all the tape from one spool would be wound on the other spool before the end of the operating cycle and breakage of the tape or the driving mechanism might occur.

In order to render the operation of such apparatus foolproof, there are also provided means for preventing the energization of the motor unless there is available operating energy for the various control circuits associated with the motor drive.

In the form shown, the motor 11—35 is shown arranged to be energized from power supply leads 3+0, 3—0, through an energizing switch 3—10, which, as in Fig. 1, establishes in the "on" position 3—12 the energizing circuits through lead 3+02 to the filter rectifier system of the amplifier. In order to prevent energization of the motor before the filter rectifier, which supplies D. C. energy for the control circuits, is fully energized through lead 3+02, there is included in the motor supply lead 3+01 normally open contacts of a time action relay 11—59 which is energized from the filter rectifier supply terminal 2+0 to close, after a time delay, its contacts and complete the energizing circuit to the motor 11—35 only when the rectifier-filter circuit is ready for operation. With this arrangement, the motor energizing circuit is completed only after the filter rectifier circuit is energized and energizes from its positive filter supply lead 2+0 the motor cutoff relay 11—59.

There is also shown how to combine a reversely driven magnetic track recording arrangement with a recording control mechanism of the type described in connection with Figs. 1 to 3. A recording synchronizing cam 3—05 with its cam switch 3—5 and a dial knob 3—31 are shown driven by the tape drive mechanism through a coupling clutch 7—73 connected to the synchronizing mechanism 11—46. In order to translate the oscillatory movement of the synchronizing mechanism into a unidirectional movement imparted to the recording control mechanism, a unidirectional driving mechanism is interposed between the coupling clutch 3—73 and the recording synchronizing cam 3—05.

For the sake of simplicity, the unidirectional driving mechanism 11—63 is shown formed of a shaft which is driven by the coupling clutch 3—73 and is arranged to drive through oppositely acting one-way clutches 11—64, 11—65 two gears 11—66, 11—67, respectively, which are affixed to the shaft of the synchronizing cam 3—05, an additional reversing gear being interposed between gears 11—65 and 11—67 so that the oscillatory motion imparted to the one-way clutches 11—64, 11—65 is translated into a unidirectional rotary movement of the gears 11—66, 11—67 and the recording synchronizing cam 3—05.

The clutches and the gears of the unidirectional driving mechanism 11—63 are so designed and proportioned that the oscillatory movement imparted to the synchronizing mechanism 11—46, during one complete operating cycle of the tape driving mechanism, will impart one complete rotation to the recording synchronizing cam 3—05.

Arrangements of the foregoing type assure that the recording synchronizing mechanism will perform one complete rotating cycle during one complete operating cycle of the tape tracks, and that the period of this operating cycle will be automatically increased or decreased by the operation of the variable speed mechanism interposed between the synchronizing mechanism and the tape driving mechanism.

The cam switch 3—5 of the recording control mechanism 11—63 is normally biased to the cam depression and is actuated by the periphery of the rotating cam to the flexed position in which its contacts 3—52 complete the energizing circuit which actuates the recording switch 2—87 to the recording position, and its contacts 3—61 energize the clutch solenoid 3—75 to couple the cam mechanism to the tape drive and keep the cam rotating until at the end of one revolution the cam switch is released to the cam depression position, thereby stopping the rotation of the cam and releasing the recording switch 2—87 to its play-back position, as in the arrangements of Figs. 1 to 3. A recording may be started by giving the cam 3—05 a slight initial turn sufficient to actuate its switch to the flexed cam periphery position, and the recording may be confined to any selected portion of the tape tracks as indicated by the pointer 11—54 as in the arrangements of Figs. 1 to 3.

A magnetic recording apparatus arranged and equipped in accordance with the principles underlying the arrangements shown in Fig. 16 makes it possible to use one or more pairs of tape tracks, for making a continuous recording extending over a selected length of both tracks of each pair while they are moved back and forth through the magnetic heads associated with each track, and to repeat a recording any desired number of times in a manner similar to an endless recording arrangement of the type described in connection with Fig. 1. Its recording control arrangement 11—63 makes it possible to start a recording on any selected portion of the tape tracks and to confine a recording to any selected portion of the tape tracks, in a way analogous to the operation of such recording control arrangement described in connection with Figs. 1 to 3. The variable speed mechanism 11—51, 11—52 interposed between the tape driving mechanism and the cycle control mechanism 11—46 makes it possible to vary the effective length of the recording and play-back cycle.

The moment of inertia of the motor 11—35, which, as pointed out above, rotates at all times in the same direction, is so chosen and designed as to have sufficient inertia in relation to the moment of inertia of the reversely driven tape transporting mechanism and the tape tracks carried thereby, and all the elements of the mechanism are so designed and proportioned as to assure that the motion of the tape tracks will be substantially instantaneously reversed with only a negligibly short interval in the recording or reproducing operation.

As used herein, the term "magnetic recording transducing" is intended to mean the process of magnetically recording electric signals or the process of reproducing magnetic recordings into electric signals, or the combination of the two processes. The features and principles underlying the invention described above in connection with specific exemplifications, will suggest to those skilled in the art many other modifications thereof. It is accordingly desired that the appended claims shall not be limited to the specific details shown and described in connection with the exemplifications thereof.

I claim:

1. In a magnetic recording arrangement, a looped magnetic signal carrier of predetermined length for retaining and reproducing records, guide means for guiding said carrier in a longitudinal direction along a predetermined path including means for impelling said carrier at substantially uniform velocity along said path, magnetic transducing means located along said path for cooperation with an element of said carrier for recording and reproducing records while said carrier moves past said transducing means, and control means actuable to cause repeated reproduction of a recording on said carrier during a controllable continuous period, said control means including movable means actuable to move in predetermined synchronized relation to said guide means for selectively making a new recording on at least a portion of said carrier.

2. In a magnetic recording apparatus, a coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively making a new recording on said carrier.

3. In a magnetic recording apparatus, a coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively confining a new recording on a selected portion of the carrier length.

4. In a magnetic recording apparatus, a coiled magnetic carrier of predetermined length for retaining and reproducing records, magnetic transducing means cooperating with said carrier for recording and reproducing a record while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively confining the reproduction of the recording to a selected portion of the carrier length.

5. In a magnetic recording apparatus, a coiled magnetic carrier of predetermined length for retaining and reproducing records, magnetic transducing means cooperating with said carrier for recording and reproducing a record while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively confining a new recording on a selected portion of the carrier length for selectively confining the reproduction of the record to a selected portion of the carrier length.

6. In a magnetic recording apparatus, an endless coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said carrier for selectively making a new recording on said carrier.

7. In a magnetic recording apparatus, an endless coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively confining a new recording to a selected portion of the carrier length.

8. In a magnetic recording apparatus, an endless coiled magnetic carrier of predetermined length for retaining and reproducing records, magnetic transducing means cooperating with said carrier for recording and reproducing a record while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said carrier for selectively confining the reproduction of the recording to a selected portion of the carrier length.

9. In a magnetic recording apparatus, an endless coiled magnetic carrier of predetermined length for retaining and reproducing records, magnetic transducing means cooperating with said carrier for recording and reproducing a record while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable repeated reproduction of a record sequence recorded on said carrier, said control means including means actuable to move in a predetermined synchronized relation to said carrier for selectively confining a new recording to a selected portion of the carrier length and for selectively confining the reproduction of the record to a selected portion of the carrier length.

10. In a magnetic recording apparatus, a coiled magnetic carrier of predetermined length for retaining and reproducing records, magnetic transducing means cooperating with said carrrier for recording and reproducing records while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively making a new recording on said carrier, said magnetic sound carrier being formed of at least two magnetic tape tracks which are cyclically moved back and forth past magnetic transducing means for successively recording on different tapes moving in opposite directions.

11. In a magnetic recording apparatus, a coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said carrier for selectively confining a new recording to a selected portion of the carrier length, said magnetic sound carrier being formed of at least two parts which are cyclically moved back and forth past magnetic transducing means for successively recording on different carrier parts moving in opposite directions.

12. In a magnetic recording apparatus, a coiled magnetic carrier of predetermined length for retaining and reproducing records, magnetic transducing means cooperating with said carrier for recording and reproducing a record while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively confining the reproduction of the recording to a selected portion of the carrier length, said magnetic sound carrier being formed of at least two parts which are cyclically moved back and forth past magnetic transducing means for successively recording on different carrier parts moving in opposite directions.

13. In a magnetic recording apparatus, a coiled magnetic carrier of predetermined length for retaining and reproducing records, magnetic transducing means cooperating with said carrier for recording and reproducing a record while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively confining a new recording to a selected portion of the carrier length and for selectively confining the reproduction of the record to a selected portion of the carrier length, said magnetic sound carrier being formed of at least two parts which are cyclically moved back and forth past magnetic transducing means for successively recording on different carrier parts moving in opposite directions.

14. In a magnetic recording apparatus, a coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively making a new recording on said carrier, said magnetic carrier being formed of at least two endless carrier tracks guided past magnetic transducing means for selectively recording and reproducing sound on any one of said carriers.

15. In a magnetic recording apparatus, a coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively confining a new recording on a selected portion of the carrier length, said magnetic carrier being formed of at least two endless carrier tracks guided past magnetic transducing means for selectively recording and reproducing sound on any of said carriers.

16. In a magnetic recording apparatus, a coiled magnetic carrier of predetermined length for retaining and reproducing records, magnetic transducing means cooperating with said carrier for recording and reproducing a record while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively confining the reproduction of the recording to a selected portion of the carrier length, said magnetic carrier being formed of at least two endless carrier tracks guided past magnetic transducing means for selectively recording and reproducing sound on any of said carriers.

17. In a magnetic recording apparatus, a coiled magnetic carrier of predetermined length for retaining and reproducing records, magnetic transducing means cooperating with said carrier for recording and reproducing a record while said carrier moves past said transducing means, movable guide means for guiding and driving said carrier past said transducing means, control means actuable to cause reproduction of the record on said carrier, said transducer means and said control means being arranged and correlated to cooperate in effecting during a continuous controllable period repeated reproduction of a record sequence recorded on said carrier, said control means including means actuable to move in a predetermined synchronized relation to said guide means for selectively confining a new recording to a selected portion of the carrier length and for selectively confining the reproduction of the record to a selected portion of the carrier length, said magnetic carrier being formed of at least two endless carrier tracks guided past magnetic transducing means for selectively recording and reproducing sound on any of said carriers.

18. In a magnetic sound recording apparatus, an endless magnetic sound carrier, guiding means supporting and guiding tape in a continuous longitudinal motion, motor drive means for imparting a velocity to said carrier, electric sound current amplifying means, magnetic inducing means mounted along the path of said carrier cooperating selectively with the input or output circuit of said amplifying means for recording or reproducing sound by magnetic flux variations interlinking said inducing means and successive elements of said carrier, sound reproducing means cooperating selectively with the output circuit of said amplifying means for reproducing sound recorded on said carrier by said core means, and control means having movable means releasably coupled to said drive means for selectively starting the recording operation on a selected portion of said carrier.

19. In a magnetic sound recording apparatus, an endless magnetic sound carrier, guiding means supporting and guiding said carrier in a continuous longitudinal motion, motor drive means for imparting a uniform velocity to said carrier, electric sound current amplifying means, magnetic inducing means mounted along the path of said carrier cooperating selectively with the input or output circuit of said amplifying means for recording or reproducing sound by magnetic flux variations interlinking said inducing means and successive elements of said carrier, sound reproducing means cooperating selectively with the output circuit of said amplifying means for reproducing sound recorded on said carrier by said inducing means, and control means having movable means releasably coupled to said drive means for selectively starting a recording operation on a selected portion of said carrier.

20. In a magnetic sound recording apparatus, an endless magnetic sound carrier, guiding means supporting and guiding said carrier in a continuous longitudinal motion, motor drive means for imparting a uniform velocity to said carrier, electric sound current amplifying means, magnetic inducing means mounted along the path of said carrier cooperating selectively with the input or output circuit of said amplifying means for recording or reproducing sound by magnetic flux variations interlinking said inducing means and successive elements of said carrier, sound reproducing means cooperating selectively with the output circuit of said amplifying means for reproducing sound recorded on said tape by said inducing means, and control means having movable means reelasably coupled to said drive means for selectively confining a recording operation to a selected portion of said carrier.

21. In a magnetic recording apparatus, an endless magnetic carrier, guide means for guiding said carrier in a longitudinal motion along a predetermined path including drive means for imparting to said carrier a substantially uniform velocity along said path, magnetic transducing means mounted along the path of said carrier for recording and reproducing a record by magnetic flux variations interlinking said transducing means and successive elements of said carrier, and control means actuable to cause continuous reproduction of the recording on said carrier and having means releasably coupled to said guide means for selectively recording a selected portion of said carrier.

22. In a magnetic recording apparatus, a coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means actuable between a reproducing condition in which it causes reproducing of a record on said carrier and a recording condition in which a record is made on said carrier, said transducer means and said control means being arranged and correlated to cooperate in effecting during a continuous controllable period repeated reproduction of a record sequence recorded on said carrier, said control means comprising a control member movable between a reproducing position and a recording position, and a synchronizing member actuable to move in a predetermined synchronized relation to said carrier upon actuation of said control member to the recording position for actuating said control means to its reproducing condition after a selected length of motion of said carrier.

23. In a magnetic recording apparatus, a coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means including switch means actuable between a reproducing condition in which it causes reproduction of a record on said carrier and a recording condition in which a record is made on said carrier, said transducer means and said control means being arranged and correlated to cooperate in effecting during a continuous controllable period repeated reproduction of a record sequence recorded on said carrier, said control means comprising a control member movable between a reproducing position and a recording position, and a synchronizing member actuable to move in a predetermined synchronized relation to said guide means upon actuation of said control member to the recording position for actuating said control means to its reproducing condition after a selected length of motion of said synchronizing member.

24. In a magnetic recording apparatus, a coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means actuable between a reproducing condition in which it causes reproduction of a record on said carrier and a recording condition in which a record is made on said carrier, said transducer means and said control means being arranged and correlated to cooperate in effecting during a continuous controllable period repeated reproduction of a record sequence recorded on said carrier, said control means comprising a control member movable between a reproducing position and a recording position, and a synchronizing member actuable to move in a predetermined synchronized relation to said carrier upon actuation of said control member to the recording position for actuating said control means to its reproducing condition after a selected length of motion of said carrier, said control member being so arranged and designed that on actuating said control member to its recording position it actuates said synchronizing member to move in said synchronized relation, and that on returning said control member to its reproducing position it causes reproduction of a record irrespective of the operation of said synchronizing member.

25. In a magnetic recording apparatus, a coiled magnetic carrier of predetermined length for retaining and reproducing records, magnetic transducing means cooperating with said carrier for recording and reproducing records while said carrier moves past said transducing means, movable guide means for guiding and driving said carrier past said transducing means, control means including switch means actuable between a reproducing condition in which it causes reproduction of a record on said carrier and a recording condition in which a record is made on said carrier, said transducer means and said control means being arranged and correlated to cooperate in effecting during a continuous controllable period repeated reproduction of a record sequence recorded on said carrier, said control means comprising a control member movable between a reproducing position and a recording position, and a synchronizing member actuable to move in a predetermined synchronized relation to said guide means upon actuation of said control member to the recording position for actuating said control means to its reproducing condition after a selected length of motion of said synchronizing member, said control member being so arranged and designed that on actuating said control member to its recording position it actuates said synchronizing member to move in said synchronized relation, and that on returning said control member to its reproducing position it causes reproduction of a record irrespective of the operation of said synchronizing member.

26. A magnetic recording arrangement defined by claim 1, characterized by the fact that the control means include a control member movable between a reproducing position and a recording position and a synchronizing member actuable to move in a predetermined synchronized relation to said carrier upon actuation of said control member to the recording position for actuating said control means to its reproducing position after a predetermined length of the motion of the carrier.

27. In a magnetic recording arrangement, a looped magnetic signal carrier of predetermined length for retaining and reproducing records, guide means for guiding said carrier in a longitudinal direction along a predetermined path including means for impelling said carrier at substantially uniform velocity along said path, magnetic transducing means located along said path for cooperation with an element of said carrier for recording and reproducing records while said carrier moves past said transducing means, and control means actuable to cause repeated reproduction of a recording on said carrier during a controllable continuous period, said control means including a control member movable between a reproducing position and a recording position and a synchronizing member actuable to move in predetermined synchronized relation to said carrier, said control member and said control means being so designed and arranged that on actuating said control member to its recording position it actuates said synchronizing member to move in said synchronized relation to the carrier and that on returning said control member to its reproducing position it causes reproduction of the record irrespective of the operation of the synchronizing member.

28. In a magnetic recording arrangement, a looped magnetic signal carrier of predetermined length for retaining and reproducing records, guide means for guiding said carrier in a longitudinal direction along a predetermined path including means for impelling said carrier at substantially uniform velocity along said path, magnetic transducing means located along said path for cooperation with an element of said carrier for recording and reproducing records while said carrier moves past said transducing means, and control means actuable to cause repeated reproduction of a recording on said carrier during a controllable continuous period, said transducer means and said control means being arranged and correlated to cooperate in affecting during a controllable period repeated reproduction of a record sequence recorded on said carrier in predetermined timed relation, said control means including means operable in predetermined synchronized relation to the motion of said carrier for selectively making a new record on said carrier.

29. An electronic recording and reproducing device comprising, in combination, a pick-up coil, a recording coil, and a signal obliterating means; an amplifier, relay means for operably connecting said amplifier in cascade arrangement with either said pick-up coil or with said recording coil during reproducing and recording periods, respectively, said relay means automatically connecting a source of energy to the signal obliterating means when the amplifier is connected to the recording coil, normally-open contact means connected in series with said relay means and a source of E. M. F., timing means including a motor and motor-driven cam for closing said contact means during a recording period of predetermined duration, and remote recording control means including a momentary contact switch in series with said motor for initiating operation of said timing means.

30. In a recording and reproducing system, a magnetic recording and reproducing device including a pick-up coil, a recording coil, and a signal obliterating means; an electronic amplifier, a signal source external to said recording and reproducing device, relay means for operatively connecting an input circuit of said amplifier either with said pick-up coil or with said signal source during reproducing and recording periods, respectively, said relay means also connecting an output circuit of said amplifier to said recording coil and connecting a source of E. M. F. to said signal obliterating means during recording periods, a timing means including a motor and motor-actuated contact-closure means for operating said relay means during a recording period of predetermined duration, switching means remote from said relay means and said timing means for initiating operation of said timing means, and a stick circuit for said timing means to maintain operation of said timing means throughout the recording period.

31. A magnetic recording and reproducing system of the class described comprising a magnetizable material of closed-loop type for recording signal intelligence thereon, means for moving said magnetizable material, signal pick-up, recording and obliterating means disposed adjacent said magnetizable material, electronic amplifier means, relay switching means for operably connecting said amplifier means and said pick-up means to effect reproduction of signals impressed on said magnetizable material and for operably connecting said amplifier means to said recording means and for connecting said obliterating means to effect recording of signals on said magnetizable material during recording periods, contact means connected in series with said relay means and a source of E. M. F., timing means for closing said contact means during a predetermined recording cycle, the time of said recording cycle being substantially equal to the time required for said magnetizable material of closed-loop type to make one complete revolution, and a momentary contact switch for initiating the operation of said timing motor.

32. A magnetic recording and reproducing system of the class described comprising a magnetizable material of closed-loop type for recording signal intelligence thereon, a motor for continuously moving said magnetizable material, a signal pick-up coil, a recording coil, said coils being disposed adjacent said magnetizable material, electronic amplifier means, relay switching means for normally connecting said amplifier means and said pick-up coil for amplifying signals impressed on said magnetizable material and for operably connecting said amplifier means to said recording coil during a predetermined recording period, a timing motor for establishing the predetermined recording period, the time of said recording period being substantially equal to the time required for said magnetizable material of closed-loop type to make one complete revolution, contact means operated by said timing motor and connected in series with said relay means and a source of E. M. F. for operating said relay means only during the predetermined recording period, and a momentary contact switch for initiating the operation of said timing motor.

33. An electronic recording and reproducing device comprising, in combination, a pick-up coil, a recording coil, and a signal obliterating means; an amplifier, relay means for operably connecting said amplifier in cascade arrangement with either said pick-up coil or with said recording coil during reproducing and recording periods, respectively, said relay means automatically connecting a source of energy to the signal obliterating means when the amplifier is connected to the recording coil, normally open contact means connected in series with said relay means and a source of E. M. F., timing means including a motor and motor-driven cam for closing said contact means during a recording period of predetermined duration, a recording control switch having normally open contacts connected in series with said motor and a source of E. M. F. for initiating operation of said timing means, and normally open contact means connected in shunt with said recording control switch, said last mentioned contact means being closed by movement of said cam during the recording period.

SEMI JOSEPH BEGUN.

REFERENCES CITED

The following references are of record in the file of this patent:

UNITED STATES PATENTS

| Number | Name | Date |
|---|---|---|
| 1,612,359 | Chipman | Dec. 28, 1926 |
| 1,883,560 | Chipman | Oct. 18, 1932 |
| 2,044,033 | Von Heising | June 16, 1936 |